(12) United States Patent
Botelho et al.

(10) Patent No.: US 10,179,975 B2
(45) Date of Patent: Jan. 15, 2019

(54) INDUSTRIAL FABRIC AND METHOD OF WELDING SEAM AREA USING ULTRASONIC WELDING

(71) Applicant: Albany International Corp., Rochester, NH (US)

(72) Inventors: Joseph P. Botelho, Lincoln, RI (US); Victor P. Laskorski, N. Attleborough, MA (US); James P. Mastin, Rochester, NH (US); Jennifer L. Rademan, Pittsville, WI (US)

(73) Assignee: Albany International Corp., Rochester, NH (US)

( * ) Notice: Subject to any disclaimer, the term of this patent is extended or adjusted under 35 U.S.C. 154(b) by 337 days.

(21) Appl. No.: 14/940,480

(22) Filed: Nov. 13, 2015

(65) Prior Publication Data

US 2016/0138221 A1   May 19, 2016

Related U.S. Application Data

(62) Division of application No. 13/730,101, filed on Dec. 28, 2012, now Pat. No. 9,199,412.

(51) Int. Cl.
  *D21F 7/10* (2006.01)
  *B29C 65/08* (2006.01)
  *D21F 1/00* (2006.01)
  *B29C 65/74* (2006.01)
  *B29C 65/00* (2006.01)
  *D06H 5/00* (2006.01)

(52) U.S. Cl.
  CPC .............. *D21F 7/10* (2013.01); *B29C 65/08* (2013.01); *B29C 65/7443* (2013.01);
  (Continued)

(58) Field of Classification Search
  CPC .................................. B65G 15/34; D21F 7/10
  See application file for complete search history.

(56) References Cited

U.S. PATENT DOCUMENTS

4,090,897 A    5/1978  Minick
4,464,488 A    8/1984  Zimmerman et al.
(Continued)

FOREIGN PATENT DOCUMENTS

DE    3923785 A1    1/1991
EP    1258557 A2   11/2002
(Continued)

OTHER PUBLICATIONS

International Search Reportand Written Opinion dated Feb. 12, 2014.

*Primary Examiner* — Jenna L Johnson
(74) *Attorney, Agent, or Firm* — McCarter & English, LLP

(57) ABSTRACT

The invention relates to ultrasonic welding of industrial fabrics. Specifically, the invention relates to methods for ultrasonically welding the seam area of industrial fabrics using a textured horn and/or anvil. The fabric edges are overlapped as woven or one or both edges can have some warp or weft yarns raveled out. The method involves ultrasonically bonding the overlapped fabric edges, reducing the caliper of the two stacked edges to match the body caliper of the fabric itself. The bonded area can then be perforated using laser or other mechanical means to produce a seam having the same woven texture and permeability (air and/or water) as the body of the fabric.

8 Claims, 25 Drawing Sheets

(52) U.S. Cl.
CPC ...... *B29C 65/7451* (2013.01); *B29C 65/7457* (2013.01); *B29C 66/1122* (2013.01); *B29C 66/43* (2013.01); *B29C 66/729* (2013.01); *B29C 66/81433* (2013.01); *B29C 66/8242* (2013.01); *B29C 66/8322* (2013.01); *B29C 66/83221* (2013.01); *B29C 66/92611* (2013.01); *B29C 66/92651* (2013.01); *D06H 5/002* (2013.01); *D21F 1/0054* (2013.01); B29C 66/0326 (2013.01); B29C 66/0346 (2013.01); B29C 66/1248 (2013.01); B29C 66/22 (2013.01); B29C 66/4322 (2013.01); B29C 66/4324 (2013.01); B29C 66/69 (2013.01); B29C 66/71 (2013.01); B29C 66/73921 (2013.01); B29C 66/929 (2013.01); B29C 66/9221 (2013.01); B29C 66/949 (2013.01); B29C 66/9513 (2013.01); B29C 66/9517 (2013.01); Y10T 428/24273 (2015.01); Y10T 428/24785 (2015.01)

(56) References Cited

U.S. PATENT DOCUMENTS

| | | | |
|---|---|---|---|
| 4,501,782 A | 2/1985 | Weatherly et al. | |
| 5,360,656 A | 11/1994 | Rexfelt et al. | |
| 5,464,488 A * | 11/1995 | Servin | B29C 66/032 156/157 |
| 5,919,539 A | 7/1999 | Bisbis et al. | |
| 6,702,927 B2 * | 3/2004 | Moriarty | D06H 5/00 139/383 A |
| 6,797,088 B2 * | 9/2004 | Solinski | B29C 65/08 156/159 |
| 6,878,238 B2 * | 4/2005 | Bakken | D21F 1/0054 156/166 |
| 7,410,554 B2 | 8/2008 | Davenport | |
| 2002/0174933 A1 | 11/2002 | Solinski | |
| 2003/0183358 A1 | 10/2003 | Yook | |
| 2004/0016473 A1 | 1/2004 | Hansen | |
| 2007/0181207 A1 | 8/2007 | Harrison | |
| 2009/0061151 A1 | 3/2009 | LaFond et al. | |
| 2009/0090425 A1 | 4/2009 | Hawes et al. | |

FOREIGN PATENT DOCUMENTS

| | | |
|---|---|---|
| JP | 59-30987 A | 2/1984 |
| JP | 10-226978 A | 8/1998 |
| JP | 2003-096686 A | 4/2003 |
| JP | 2006-508259 A | 3/2006 |
| JP | 2007-529638 A | 10/2007 |
| JP | 2010-100961 A | 5/2010 |
| TW | 2006 31772 A | 9/2006 |

* cited by examiner

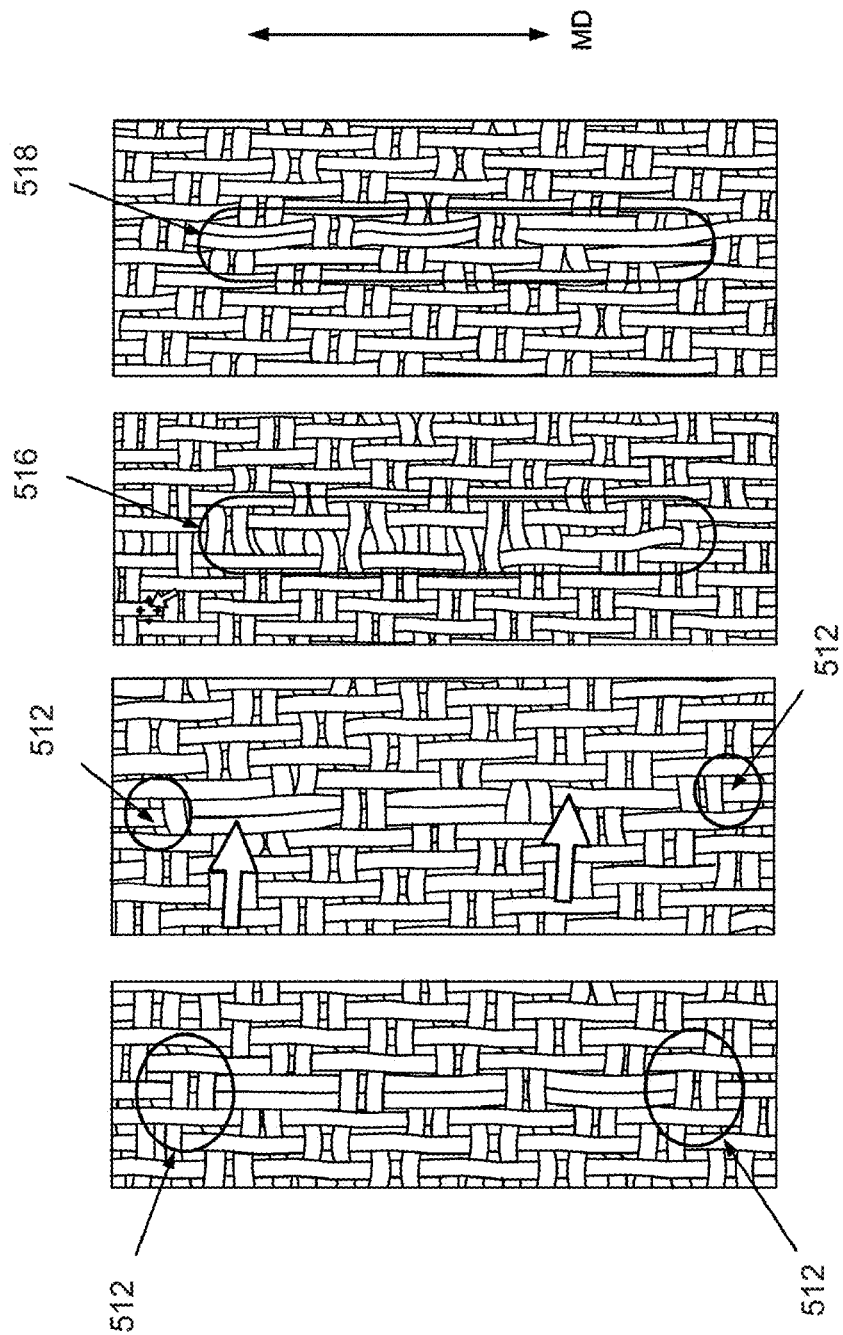

INDUSTRIAL FABRIC AND METHOD OF WELDING SEAM AREA USING ULTRASONIC WELDING

CROSS-REFERENCE TO RELATED APPLICATIONS

This application is a division of U.S. patent application Ser. No. 13/730,101 filed Dec. 28, 2012.

FIELD OF THE INVENTION

The present invention relates to industrial fabrics, and more specifically to a method for welding seam area of an industrial fabric using ultrasonic welding.

INCORPORATION BY REFERENCE

All patents, patent applications, documents and/or references referred to herein are incorporated by reference, and may be employed in the practice of the present invention.

BACKGROUND OF THE INVENTION

During the papermaking process, a cellulosic fibrous web is formed by depositing a fibrous slurry, that is, an aqueous dispersion of cellulose fibers, on a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulose fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speed. That is to say, the fibrous slurry is continuously deposited onto the forming fabric in the forming section, while a newly manufactured paper sheet is continuously wound onto rolls after it exits from the dryer section.

It should also be appreciated that the vast majority of forming, press and dryer fabrics are; or at least include as a component, a woven fabric in the form of an endless loop having a specific length, measured longitudinally therearound, and a specific width, measured transversely thereacross. Because paper machine configurations vary widely, paper machine clothing manufacturers are required to produce forming, press and dryer fabrics to the dimensions required to fit particular positions in the forming, press and dryer sections of the paper machines of their customers. Needless to say, this requirement makes it difficult to streamline the manufacturing process, as each fabric must typically be made to order.

The woven base fabrics themselves take many different forms. For example, they may be woven endless, or they may be flat woven using one or more layers of machine direction ("MD") and cross-machine direction ("CD") yarns, and subsequently rendered into endless form with a woven seam. Alternatively, they may be produced by a process commonly known as modified endless weaving, wherein the widthwise edges of the base fabric are provided with seaming loops using the MD yarns thereof. In this process, the MD yarns weave continuously back-and-forth between the widthwise edges of the fabric, at each edge turning back and forming a seaming loop. A base fabric produced in this fashion is placed into endless form during installation on a papermachine, and for this reason is referred to as an on-machine-seamable fabric. To place such a fabric into endless form, the two widthwise edges are brought together, the seaming loops at the two edges are interdigitated with one another, and a seaming pin or pintle is directed through the passage formed by the interdigitated seaming loops.

In any event, the woven base fabrics are in the form of endless loops, or are seamable into such forms, having a specific length, measured longitudinally therearound, and a specific width, measured transversely thereacross. Because paper machine configurations vary widely, paper machine clothing manufacturers are required to produce press fabrics, and other paper machine clothing, to the dimensions required to fit particular positions in the paper machines of their customers and therefore each fabric must typically be made to order.

Fabrics in modern papermaking machines may have a width of from 5 feet to over 33 feet, a length of from 40 feet to over 400 feet and weigh from approximately 100 pounds to over 3,000 pounds. These fabrics wear out and require replacement. Replacement of fabrics often involves taking the machine out of service, removing the worn fabric, setting up to install a fabric and installing the new fabric. While many fabrics are endless, many of those used today are on-machine-seamable. Installation of the fabric includes pulling the fabric body onto a machine and joining the fabric ends to form an endless belt.

Seams have presented significant problems in the function and use of industrial fabrics or belts in papermaking as well as nonwoven production, for example. They have a thickness, or caliper, that is different from that of the industrial fabric edges the seam is joining, and variations in caliper thickness between the seam and the fabric edges can lead to marking of the product carried on the belt. Seam failure may also result if the seam area has a greater caliper than the fabric edges as the seam becomes exposed to machine components and resulting abrasion or friction. If the belt is permeable to fluids (air and/or water), permeability/porosity differences in the seam area versus the body of the fabric can also cause objectionable marking of the products being made using the fabrics, or other operational problems.

Therefore, whether the industrial fabric is a forming, press, dryer, through-air-drying (TAD) or an engineered-fabric used to produce nonwovens by processes such as meltblowing, spunbonding or hydroentangling, or for wet processes such as a DNT belt or sludge filter belt or the like, or textile finishing belts, the properties of seam uniformity and integrity are critical.

Fabric seam terminations or the ends of the yarns that are interlaced or interwoven to form the seam are susceptible to pulling back when run on a paper, paperboard or tissue/towel or other industrial machines when the fabric is subjected to machine direction (MD) tension. To minimize this seam "pullback", the terminal ends of the yarns in the seam are conventionally bonded to an adjacent yarn with an adhesive. However, adhesives are not fully resistant to the machine running conditions, and still allow for pullbacks or yarn slippage to occur over time. Likewise, the use of adhesives with other reinforcement means such as sewing terminal ends of a paper machine clothing (PMC), TAD or engineered fabric does not produce the desired seam integrity or uniformity either.

In addition, the width of the seam area, as measured in the MD, formed using conventional techniques typically range, for example, anywhere between three and one half to twenty inches or even more. Therefore, for many reasons, it is desirable to reduce the MD length of this seam area.

FIGS. 1(a-d) show the problems associated with conventional seam formation techniques for a TAD fabric, for example, wherein the terminating ends of the two fabric edges are rewoven into the fabric, "overlapped" in the seam area and the critical points 512, where these ends might "pullback" in the MD and the ends themselves might protrude through the paper side surface, are identified (FIG. 1a). Eventually, the slippage in the overlapping area increases as shown by the arrows due to increased localized stresses in the fabric (FIG. 1b) and there is a complete slippage and a hole 516 appears in the seam area of the fabric (FIG. 1c). Accordingly the overlap region of the seam is typically reinforced by manually gluing 518 (FIG. 1d) to increase its strength; however, gluing is a laborious and time consuming process. Due to its low precision, it is also hard to limit the glue to only the overlapping yarns. In addition, the glue eventually either fails due to flexing of the fabric and/or abrasion as the fabric is run on the paper machine.

Accordingly, there is a need for a different or improved means of strengthening seam yarn end terminations, and consequent seam strength.

One possible technique for strengthening seam yarn end terminations for fabrics is thermal welding, such as ultrasonic welding. Ultrasonic refers to sounds that are above the range of human hearing, i.e. >20,000 Hz, and ultrasonic welding refers to the fusing of materials using sound waves. Many attempts have been made to use ultrasonic energy to join fabrics edges together, i.e. to join lengths of fabric into endless forms to produce an endless belt.

However, unacceptable seam formation results often arise from ultrasonic welding such as excessive melting of the yarns, reduced seam permeability, and distortions in the fabric due to localized yarn shrinkage, all stemming in part from the fact that conventional ultrasonic welding is based on modifying multiple parameters of time, energy and distance.

SUMMARY OF THE INVENTION

Therefore, there is still a need in the art for a means of creating fabric seams with acceptable surface smoothness, uniformity, porosity, openness, strength, and durability, which is applicable to a broad range of fabric types.

Accordingly, the present invention is a method for bonding one fabric edge to another fabric edge using ultrasonic energy. The fabric is woven from MD and CD yarns of a synthetic polymeric resin. The MD and CD yarns in the CD edges of the flat woven fabric can be rewoven to form a seam area, and the seam area can be exposed to ultrasonic energy, bonding MD yarn ends to each other and/or to one or more CD ends to form an endless fabric or belt.

In another embodiment, a length of flat-woven fabric with two CD edges can have each CD edge of the fabric, which contains these same MD and CD yarns, overlapped with one another for some distance in the MD and bonded to form the flat-woven fabric into an endless fabric or belt.

The two CD edges of the flat woven fabric may also be folded back upon the fabric body at each end. Some CD yarns may be raveled out, exposing lengths of the MD yarns, which can form loops. The loops from each CD fabric edge are then interdigitated with each other to form a channel, and a pin or pintle is inserted into the channel to form a seam. The seaming loops can be formed by folding back a length of the fabric at each CD edge around a pin, raveling out a plurality of CD yarns at the fold such that when the fabric end is folded back the raveled area allows the MD yarns to form loops, and the fold back fabric length is attached to the body by ultrasonic welding described above. The fold back can be in the range of 5-30 cm. The fold-back seam may be used to secure seaming coils (one or one to each edge) inserted between the MD yarn loops, and connected with pins or pintles to form a spiral link seam. In either case, the fold back area may be bonded to the fabric body prior to interdigitating of the loops through the practice of the present invention.

Alternatively, the seam for flat woven fabrics may be formed as a "pin seam," as known to those skilled in the art, which requires reweaving of MD yarns into the fabric body at each CD edge, and forming loops at each CD edge. The loops from each CD edge are then interdigitated with each other and a pin or pintle is inserted into the space to form a pin seam. In the alternative, spiral coils can be connected to the loops via pintles or pins, forming spiral link seams, as known to those skilled in the art. Such fabrics can also be improved by the ultrasonic welding technique described herein. In such seams, the MD yarns which form the seam loops themselves can be welded or fused to the CD yarns prior to interdigitating of the loops to prevent them from pulling out under operating tension in use.

Further, spiral winding of strips of woven material requiring edge to edge seams, which are described in detail in U.S. Pat. No. 5,360,656, the entire content of which is incorporated herein by reference, may also be improved by the ultrasonic welding technique described herein.

The present invention may be distinguished from the prior art by the control exercised over the length of time during which ultrasonic energy is applied to the fabric layers being bonded to one another, and over the pressure placed thereupon by the horn supplying the ultrasonic vibrations.

One embodiment of the present method comprises the steps of providing an ultrasonic welding apparatus having a textured horn for delivering ultrasonic energy to the seam area of a flat woven fabric and of providing an anvil, textured or not, toward and against which the horn may be moved to clamp the two fabric layers together for bonding. Both the horn and the anvil may be appropriately textured, or just the horn or the anvil.

In the practice of this embodiment the method, the two fabric edges are placed, one atop the other, on the anvil, and the horn is moved toward the two overlapped fabric edges on the anvil.

The horn is activated to deliver ultrasonic energy to the two overlapped fabric edges when the force with which the horn clamps them against the anvil reaches a preselected level. The force is increased over this preselected trigger force while the horn delivers ultrasonic energy to the two overlapped edges, melting and fusing the yarns from which they are woven to the degree necessary. The horn is deactivated to stop the delivery of ultrasonic energy therefrom when it reaches a preselected distance from the anvil. The force applied by the horn against the two overlapped fabric edges is then maintained for a preselected hold time to allow the molten polymeric resin material of the yarns to cool and to harden under compression. Finally, the horn is pulled back from the two overlapped fabric edges and anvil, revealing the seam area of the now endless fabric.

In practice, the two fabric edges are bonded to one another by repeating the steps described above a plurality of times, since the fabric layers being bonded to one another are typically much wider in the CD than the width of the ultrasonic horn/anvil apparatus. Accordingly, to perform a seaming operation, for example, the two overlapped fabric edges must be bonded together in increments equal in width to that of the horn/anvil, with any overlap between adjacent increments being kept to a minimum. This will require the apparatus to be moved, relative to the overlapped fabric edges, a distance equal to the width of the apparatus after each apparatus width section of the seam being formed has been bonded. The process must be repeated as many times as is necessary to move the apparatus, in steps equal to its width, across the width of the fabric.

The present invention may be applied in the seaming of fabrics into endless loops for use as industrial belts in the production of paper, board and similar products. For example, belts used on the double nip thickener (DNT) may be seamed in accordance with the present invention. Belts for any twin wire press for processing pulp and/or sludge, or any other material that must have its solids content raised by fluid removal, may be seamed through the practice of the present invention.

The present invention may also be applicable in creating a seam in a through-air-dryer (TAD) fabric, an engineered fabric for the production of nonwovens, a corrugator belt, or a fabric/belt used for textile finishing processes or a tannery processing belt. This disclosure addresses the need to make seams in paper machine clothing or any other fabrics where it is desirable that the seam area is as much like or identical to the body of the fabric as possible in terms of both texture as well as permeability to air and/or water. These seams could be in machine direction ("MD"), cross-machine direction ("CD"), or spiral along the length of the fabric.

Accordingly, one embodiment of the present invention is a method for seaming an industrial fabric having a length and a width, the method including the steps of: overlapping a first edge of the fabric with a second edge of the fabric by a predetermined distance, placing at least a portion of the overlapped edges between an ultrasonic horn and an anvil, and welding the portion of the overlapped edges by applying ultrasonic energy for a predetermined length of time or until a predetermined amount of energy is absorbed by the portion being welded, wherein a fabric contacting surface of the horn and/or anvil is textured or patterned.

According to one embodiment, the predetermined distance can be 20 cm or less, 10 cm or less, or preferably 5 cm or less. The texture or pattern can be an impression mirroring or mimicking a weave pattern of the fabric. The fabric may be produced by interweaving a plurality of warp yarns with a plurality of weft yarns. The fabric may be a flat woven fabric or a fabric produced by spiral winding a fabric strip of woven yarn material. Alternatively, the fabric can be a fabric comprising flat woven strips of material with MD seams in adjacent edges of parallel loops of the fabric. The parallels loops can have CD seam areas, which can be aligned or staggered in the MD.

According to one embodiment of the invention, the method may include the steps of unraveling one or more yarns from one or both edges of the fabric before overlapping the edges. The method may also include the step of adding one or more monofilaments, multifilament yarns, ribbons or tapes on the horn and/or anvil side of the fabric before welding the two edges. The horn and/or the anvil may have a raised portion adapted to contact a fabric surface. The horn and/or anvil may have one or more grooves to hold the "added in" one or more monofilaments, multifilament yarns, ribbons or tapes. The first and second edges of the fabric can be widthwise edges or lengthwise edges.

According to one embodiment of the invention, the method may include the step of creating one or more through holes or voids in the welded portion of the fabric. The one or more through holes or voids may be created by laser drilling or mechanical punching.

The invention according to one embodiment is an industrial fabric having a length and a width, the fabric including: a first edge of the fabric overlapped with a second edge of the fabric by a predetermined distance, wherein at least a portion of the overlapped edges is welded, and wherein the welded portion has a texture or pattern. The predetermined distance can be 20 cm or less, 10 cm or less, or preferably 5 cm or less. The fabric can be one of: paper machine fabrics (PMC), TAD fabrics, engineered fabrics and belts for the production of nonwovens, sludge dewatering, pulp dewatering fabrics used for textile finishing processes including calendering or hide tanning, and corrugators belts.

According to one embodiment, the texture or pattern can be an impression mirroring or mimicking a weave pattern of the fabric yarns. The fabric may be produced by interweaving a plurality of warp yarns with a plurality of weft yarns. The fabric may be a flat woven fabric or a fabric produced by spiral winding a fabric strip of woven yarn material. Alternatively, the fabric can be a fabric comprising flat woven strips of material with MD seams in adjacent edges of parallel loops of the fabric. The parallels loops can have CD seam areas, which can be aligned or staggered in the MD.

One or more yarns in one direction may be unraveled from one or both edges of the fabric before welding. Additionally, one or more monofilaments, multifilament yarns, ribbons or tapes can be added in a direction parallel to the raveled out yarns before welding. The first and second edges of the fabric can be widthwise edges or lengthwise edges.

According to one embodiment, the fabric may include one or more through holes or voids in the welded portion of the fabric. The one or more through holes or voids can be created by laser drilling or mechanical punching. The air and/or water permeability of the welded portion of the fabric can be similar or same as that of the rest of the fabric body.

By eliminating the shortcomings associated with conventional ultrasonic welding, the ultrasonic welding technique of the present invention is able to achieve fabric seams with increased strength, increased durability and/or useful fabric life, and seam texture and air/water permeability the same as or similar to that of the body of the fabric.

One exemplary embodiment of the present invention is an industrial fabric or belt for the forming, press and dryer sections, including a through air dryer (TAD), of a paper machine. The fabric or belt of the present invention may also be used as a component of a sheet-transfer, long nip press (LNP) or calender belt, or as other industrial process belts, such as corrugator belts. The fabric may also be used as part of a textile finishing belt, such as a sanforizing belt or tannery belt, for example. Moreover, the fabric of the invention may be used in other industrial settings where industrial belts are used to dewater a material. For example, the fabric may be used in a pulp-forming or pulp-pressing belt, in a belt used to convey and/or dewater recycled paper during the deinking process, such as a dewatering belt on a double-nip-thickener (DNT) deinking machine; or in a sludge dewatering belt. The inventive fabric may also be used in a belt and/or sleeve used in the production of nonwovens by processes such as airlaid, spunbonding, melt blowing or hydroentangling. While the term fabric, industrial fabric, and fabric structure are primarily used in this disclosure, fabric, belt, conveyor, and fabric structure are used interchangeably to describe the structures of the present invention.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred, but non-limiting, embodiments of the invention are illustrated in the accompanying drawings in which corresponding components are identified by the same reference numerals.

Terms "comprising" and "comprises" in this disclosure can mean "including" and "includes" or can have the meaning commonly given to the term "comprising" or "comprises" in U.S. Patent Law. Terms "consisting essentially of" or "consists essentially of " if used in the claims have the meaning ascribed to them in U.S. Patent Law. Other aspects of the invention are described in or are obvious (and within the ambit of the invention) from the following disclosure.

BRIEF DESCRIPTION OF THE DRAWINGS

The present invention will now be described in more complete detail with reference being made to the figures wherein like reference numerals denote like elements and parts, which are identified below.

FIGS. 1(a)-1(d) illustrate drawbacks of the use of conventional methods for seaming certain industrial fabrics;

DETAILED DESCRIPTION OF THE INVENTION

Figure 2A:
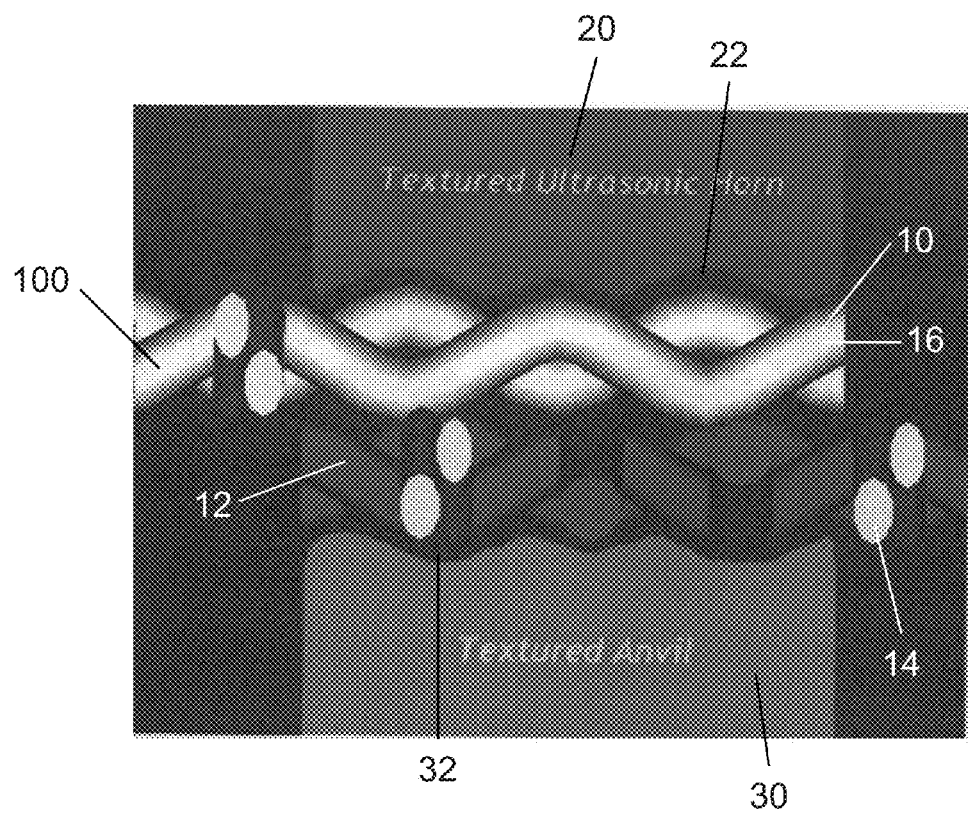
FIGS. 2(a)-2(d) illustrate steps involved in a method of ultrasonic welding according to one embodiment of the present invention.

Turning now to the figures, FIG. 2(a) is a schematic showing a step involved in a method for seaming an industrial fabric according to one embodiment of the present invention. Base fabric 100 of the industrial fabric can be a flat woven fabric, for example, wherein warp yarns 16 are interwoven with weft yarns 14 to form a fabric having a length and two widthwise edges 10, 12. Any of the weave patterns known to one of ordinary skill in the art may be used in weaving base fabric 100.

After the base fabric is woven, fabric edges 10, 12 are brought together and placed between an ultrasonic horn 20 and an anvil 30 to be welded, as shown in FIG. 2(a), for example. The overlap of the edges 10, 12 can be 20 cm or less, 10 cm or less, or preferably 5 cm or less. Either the horn 20 or the anvil 30 or both may have textured surface 22, 32, or a pattern formed thereon such that the surface 22, 32, mirrors the weave pattern within the body of the base fabric 100. That is to say the textured surface may be configured in such a manner that it takes the shape of the weave pattern of the fabric being welded. The texture may include a plurality of raised portions as well as a plurality of depressions mirroring the weave pattern within the body of the base fabric.

The depth of the weld may be controlled by, for example, setting a mechanical stop or utilizing other means to control a distance between the horn and the anvil, placing the fabric to be welded between the horn and anvil; and welding a portion of that fabric using ultrasonic energy until the horn reaches the predetermined depth then continuing to weld at that depth for a predetermined length of time or until a predetermined amount of energy is absorbed.

A mechanical stop (not shown) may be used to control the closest distance the horn can get to the anvil. In other words, the mechanical stop dictates the depth to which the ultrasonic horn can penetrate into the fabric being welded. This distance between the horn and anvil is the gap. Once the horn reaches a mechanical stop, it continues to weld at that distance for whatever time or energy specified with no further loss of fabric caliper. The material is being held under compression when the ultrasonic energy is applied. The task, however, is to control the depth of penetration of the horn or the depth of penetration of the anvil. In either case, the distance between the anvil and the horn tip determines the depth of the weld and the strength of the weld thus formed.

Figure 2B:
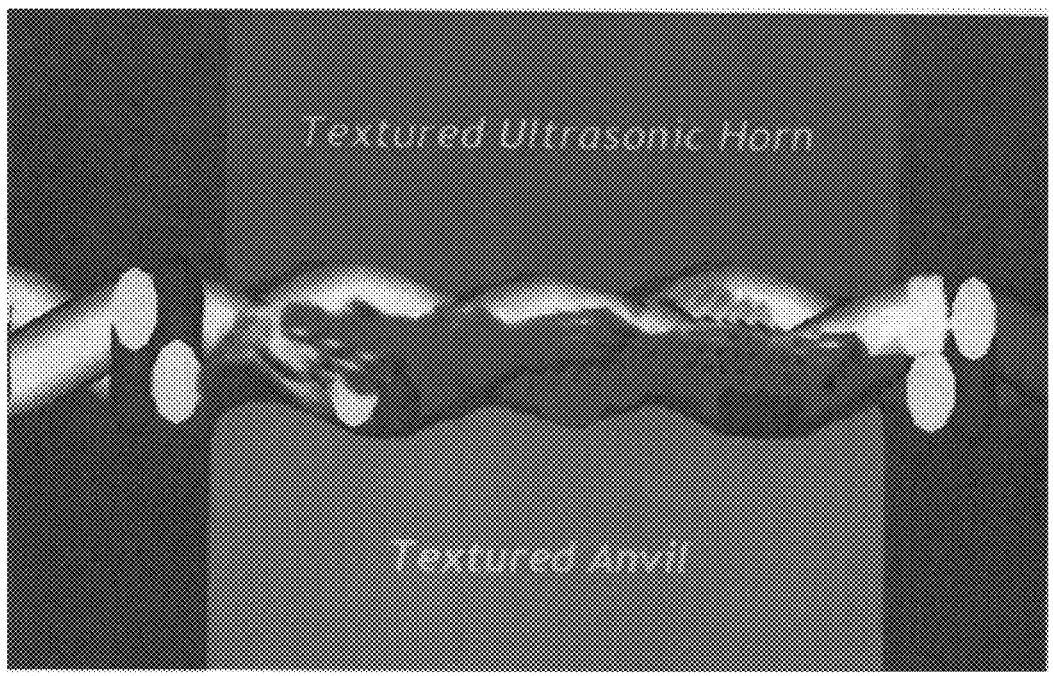
Figure 2C:
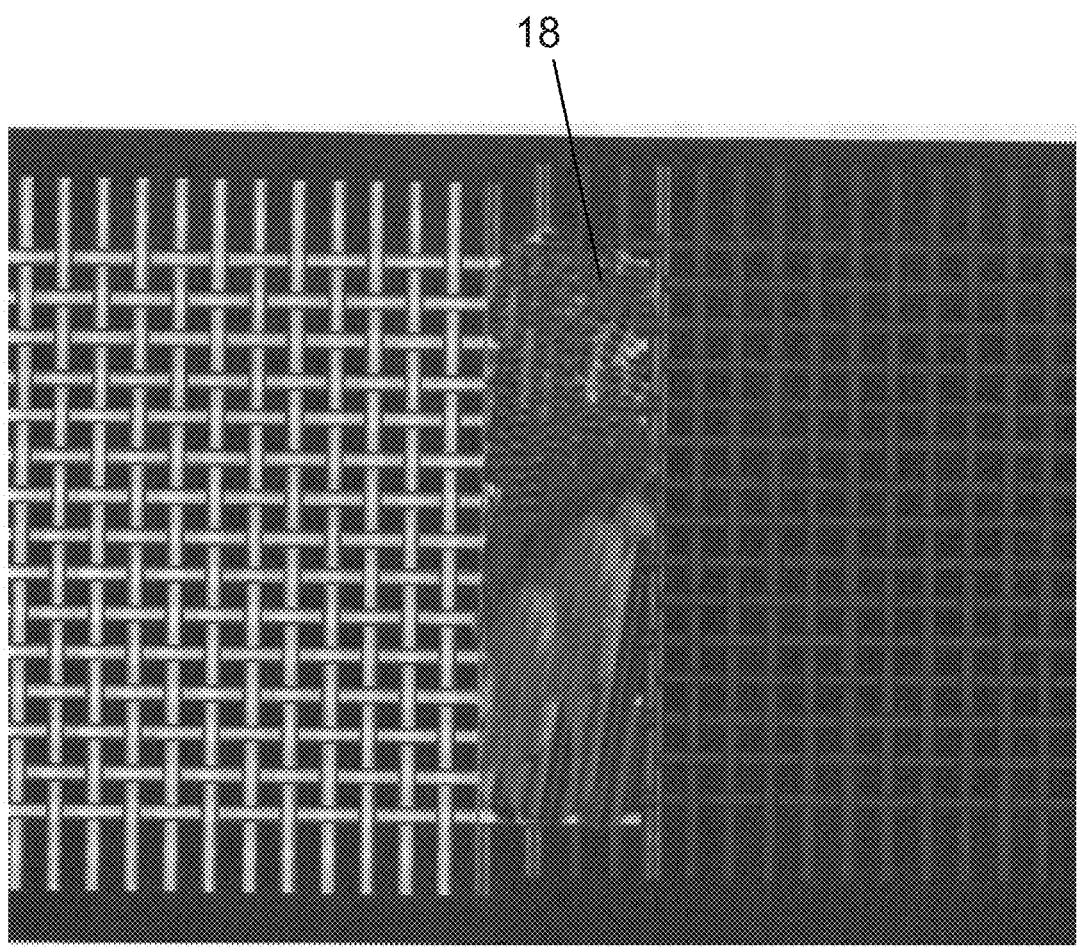
Figure 2D:
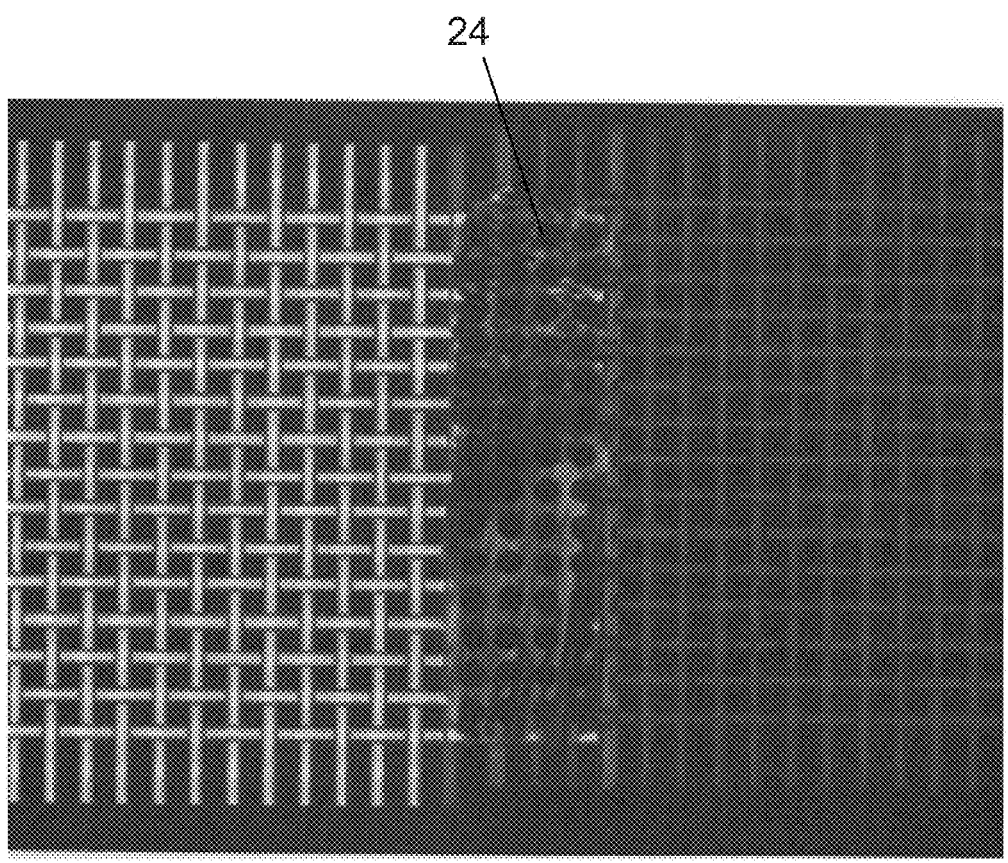

Upon welding, the yarn material in fabric edges 10, 12 is at least partially melted and the edges are joined or seamed as shown in FIG. 2(b), for example. Since the yarn material from either or both edges melts and flows into the interstices of the fabric upon welding, the weld forms a welded area 18 as shown in FIG. 2(c), for example.

An exemplary device used in ultrasonic welding of the present invention includes an ultrasonic welder or what is generally referred to as an ultrasonic stack (or acoustic stack) in the art. The stack consists of three parts, namely the converter, booster and the horn. A ring around the booster is where the stack is clamped within the stack holder. A mechanical stop is set so that the stack holder or clamp holding the neutral point of the stack or ring of the booster is prevented from moving downward any further from a point that is desired. When the ultrasonic welder is ON, the tip of the horn vibrates at certain amplitude above and below this set point. However, when the ultrasonic welder is OFF, then the mechanical stop is what sets a fixed distance between the horn and anvil. For example, if parts 1 & 2 are to be welded together, the stop is set to a predetermined height based on the caliper of the parts and the depth of weld desired. When the stack starts moving downwards, the ultrasonic tip is OFF, and soon after the horn contacts the samples, a predetermined load value is reached. This load is measured by a pressure sensor, such as a load cell for example, mounted on the stack housing. At this point the ultrasonic energy is turned ON. It is to be noted that at this point the stack housing (represented here by the ring of the booster which is clamped into it) has not contacted the stop. As welding continues, the heat generated by welding combined with the downward pressure of the horn on the parts causes the caliper of the material in the weld area to be reduced until the stack housing hits the stop, thus preventing any further reduction in fabric caliper. The ultrasonic energy, however, remains ON and continues to weld. After the ultrasonic energy is turned OFF, the welded parts are typically held under pressure for a predetermined amount of time to enable them to cool and solidify together, which gives improved physical properties such as strength to the weld area. The stack then retracts, and the weld is complete.

Welding can be controlled using time, energy or distance. For example, once a specific trigger force has been met, the machine welds for a set amount of time, or to a set amount of energy, or down a certain distance into the fabric. The ultrasonic welding technique produces a stronger bond with an acceptable amount of yarn distortion and allows for consistent welding over the entire width of the fabric because all the parameters for welding have been fixed, as well as adding an additional degree of control which makes for a much more robust process with a larger window of acceptable processing condition.

The distance between the horn and anvil is also determined by the material that is to be welded. In one embodiment of the invention, the material to be welded is a fabric and the initial distance between the horn and the anvil is equivalent to the fabric caliper or thickness.

The actual length of each weld in the MD depends on the warp yarn and weft yarn dimensions and their densities (number and spacing). The width of each weld depends also on the filament diameter and the warp or MD yarn spacing. The welded area can be made as small as possible and still obtain the required seam strength, and in order to maintain characteristics such as texture and air/water permeability like in the fabric body, and consequently in the paper or other product being produced on the fabric.

The present invention also relates to improving the seam using the methods described herein. Seams formed by the ultrasonic welding process result in benefits of shorter (as measured in the MD, or CD if using a 'parallel' loop seam) compared to conventional seams; stronger seams; seams that reduce the potential for sheet marking of paper, for example; and seams that retain similar or the same air and water permeability as the rest of the fabric body.

The present invention also relates to improving the integrity of the seam. For example, when the fabric is in use, it is important that the seam area maintain its integrity while the fabric is running on a, for example, paper or tissue machine. Maintaining the integrity of the fabric seam increases the useful running life of the fabric. Various seams for flat woven fabrics have been discussed, and the present ultrasonic welding technique can be applied to seams, such as for example a pin seam, wherein the MD yarns which form the seam loops themselves can be welded or fused to the CD yarns to prevent them from pulling out under operating tensions in use, thus improving the seam strength and durability.

The invention will now be further described by way of the following non-limiting example. One exemplary embodiment of the present invention is a method of seaming an industrial fabric utilizing ultrasonic welding and laser drilling. According to this embodiment, the two ends of the fabric are overlapped, and the amount overlap varies according to the fabric seam strength required. The fabric seam area could remain "as woven" with MD and CD yarns, or one or both of the fabric edges could have the CD yarns unraveled out of the area of the fabric to be welded. The overlapping area consisting now of two fabric layers is ultrasonically welded as described under an applied load so that the final seam caliper is equal to that of the single layer of original fabric. FIG. 2($a$) shows one exemplary embodiment of the present invention.

FIG. 2($b$) shows a stationary plunge welding or continuous welding with a beveled face horn or a rotary horn that could be use to join the fabric ends. The area of the bond becomes less permeable as mass per area that is greater than that of the original fabric is compressed to the desired thickness. As shown in FIG. 2($c$), in the case where unraveled fabrics are used, the density is double that of the original fabric.

According to one embodiment, a textured horn 20 could be used so that the area has the same topography as the fabric. A textured anvil 30 may also create the desired topography. Both the horn and the anvil could have appropriate textures.

Figure 9A:
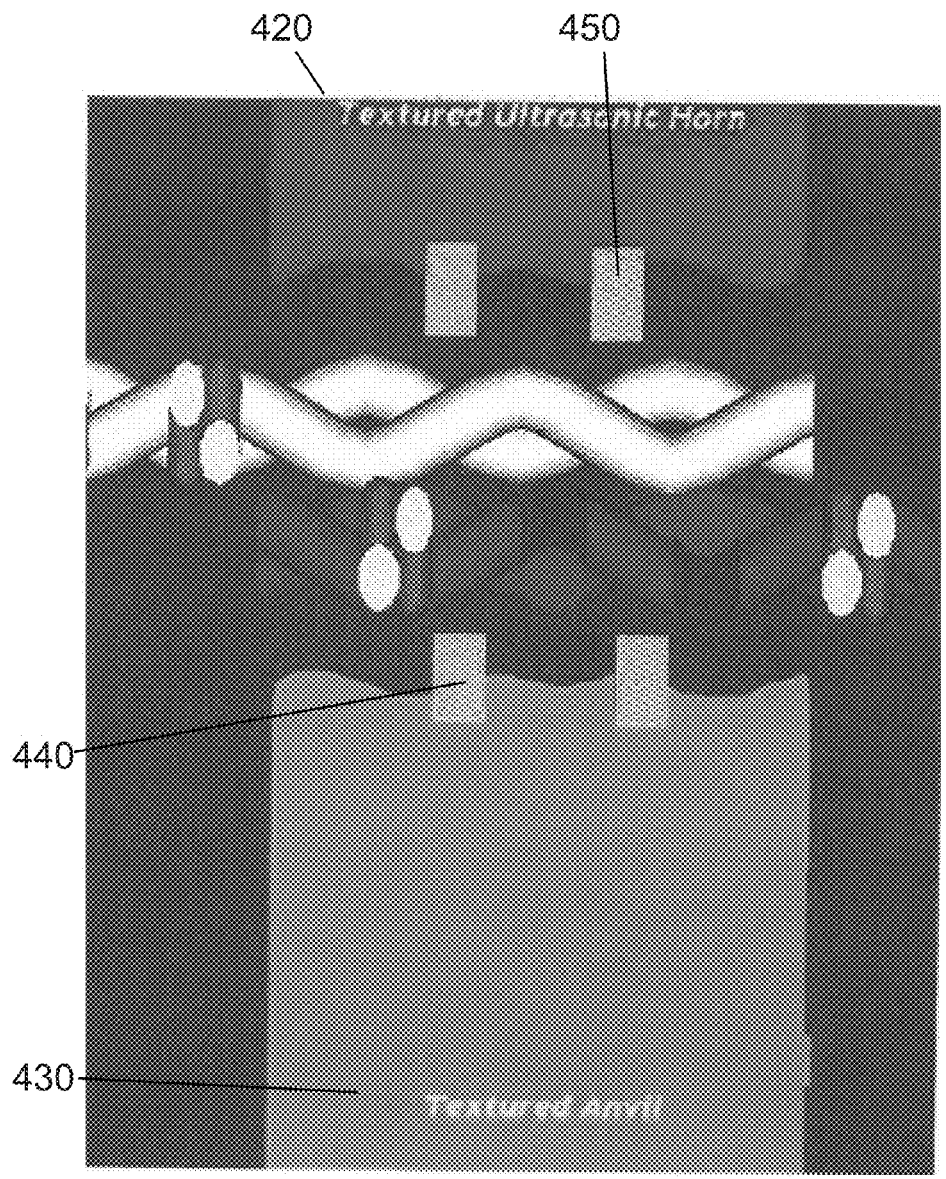
FIGS. 9(a)-9(c) illustrate steps involved in a method of ultrasonic welding according to one embodiment of the present invention.
Figure 9B:
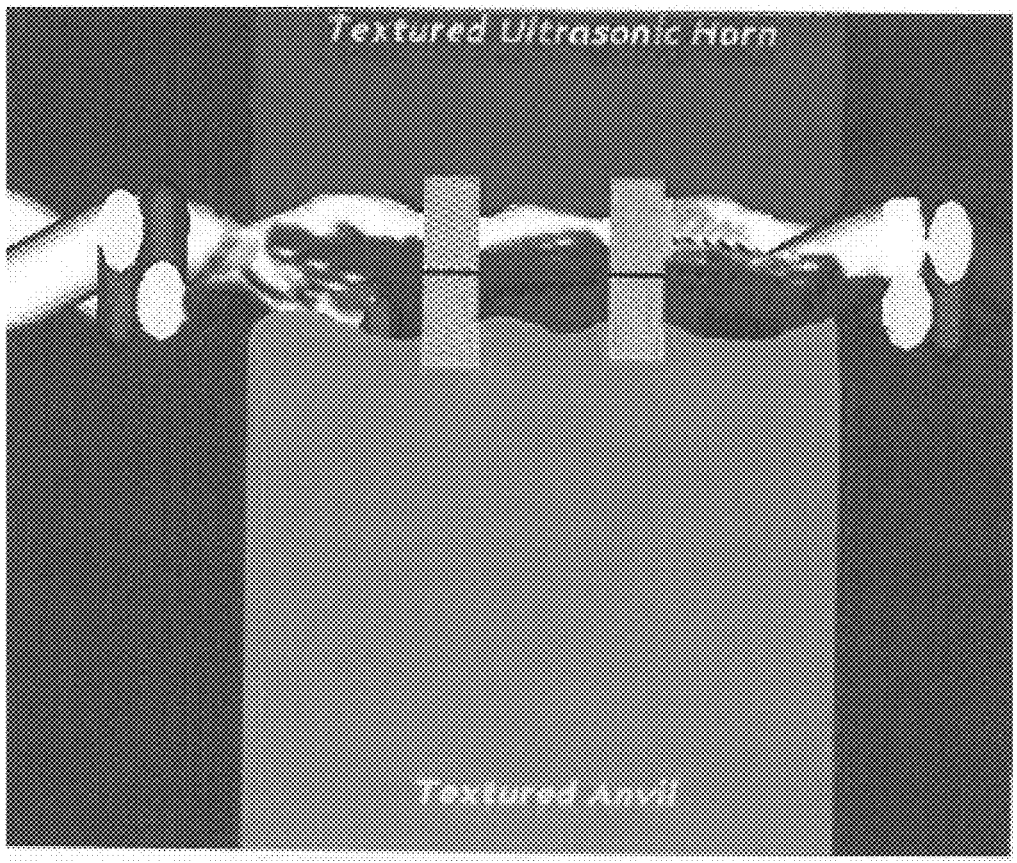
Figure 9C:
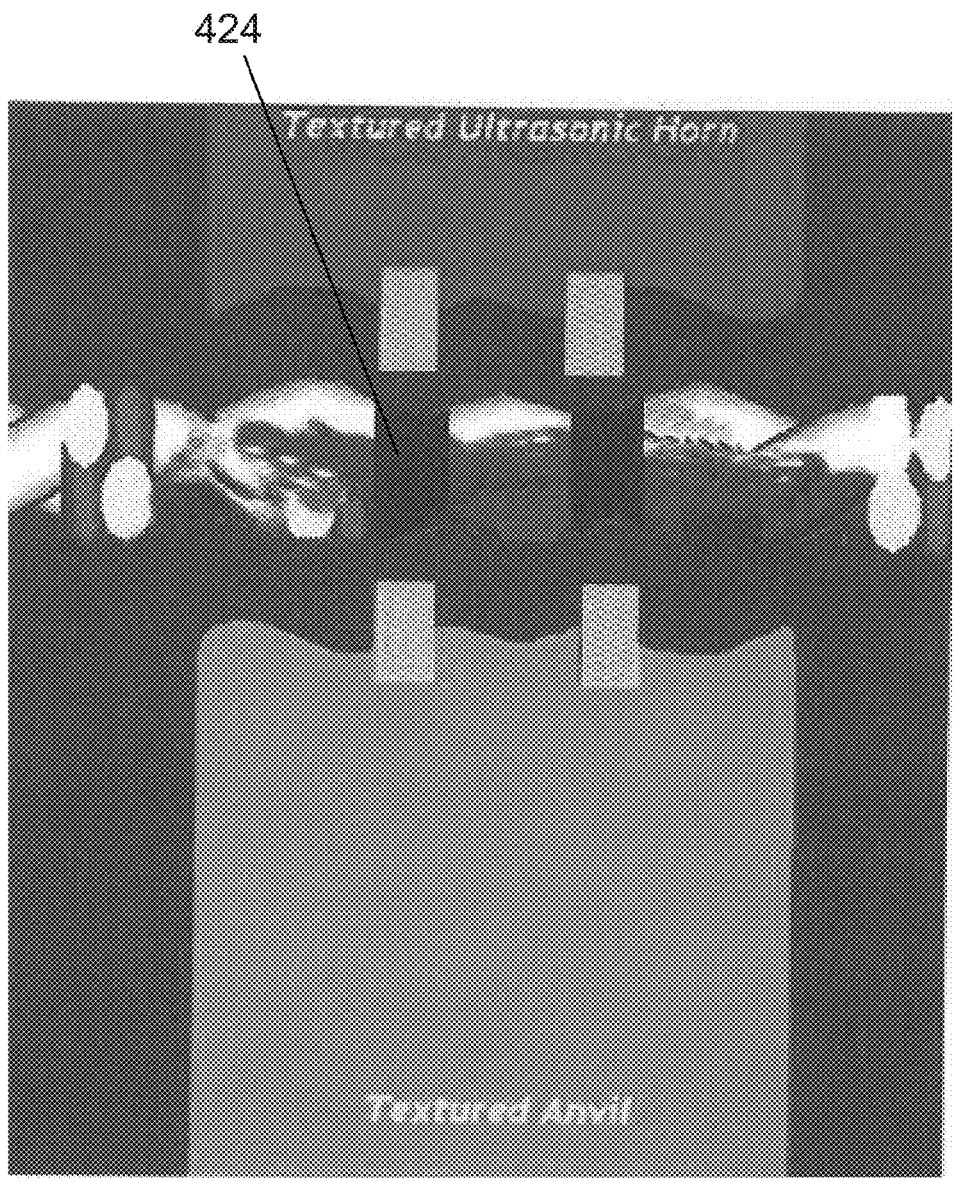

According to one embodiment, the horn 420 could have raised pins 450 to make indents where the holes 424 are to be laser drilled, as shown in FIGS. 9($a$)-($c$) for example. Similarly, the anvil 430 can have raised pins 440 to make indents from the opposite side where the holes 424 are to be laser drilled.

The weld area 418 can be, for example, laser drilled to create permeability to air and/or water similar to that of the original fabric. Holes 424 can be made perpendicular to the surface of the fabric or at varying angles to more closely simulate the original fabric. FIG. 2($d$), for example, shows a schematic of a fabric seamed according to one embodiment of the present invention having an equivalent of 324 holes per $cm^2$. On a seam 1 cm long (MD) by 10 m wide (across the fabric) with an area of 1000 $cm^2$, using a conservative drilling rate of 1000 holes per second, it can take approximately 5.5 minutes of laser drilling time to create the required holes 24.

Some benefits of the present welding method are that the bond area will have similar or the same caliper, topography, and permeability as the rest of the fabric body. The welded seam may be more durable than conventional seams throughout the life of the fabric. The methods described herein could be used to produce papermaking fabrics, including forming fabrics, press fabrics, dryer fabrics, engineered fabrics, through air drying (TAD) fabrics, as well as a component of one of these fabrics or any of the other papermaking, engineered or industrial process fabrics/belts aforementioned above. It could also be used for any other application where a bond area that mimics the body of the fabric is desired.

Figure 3:
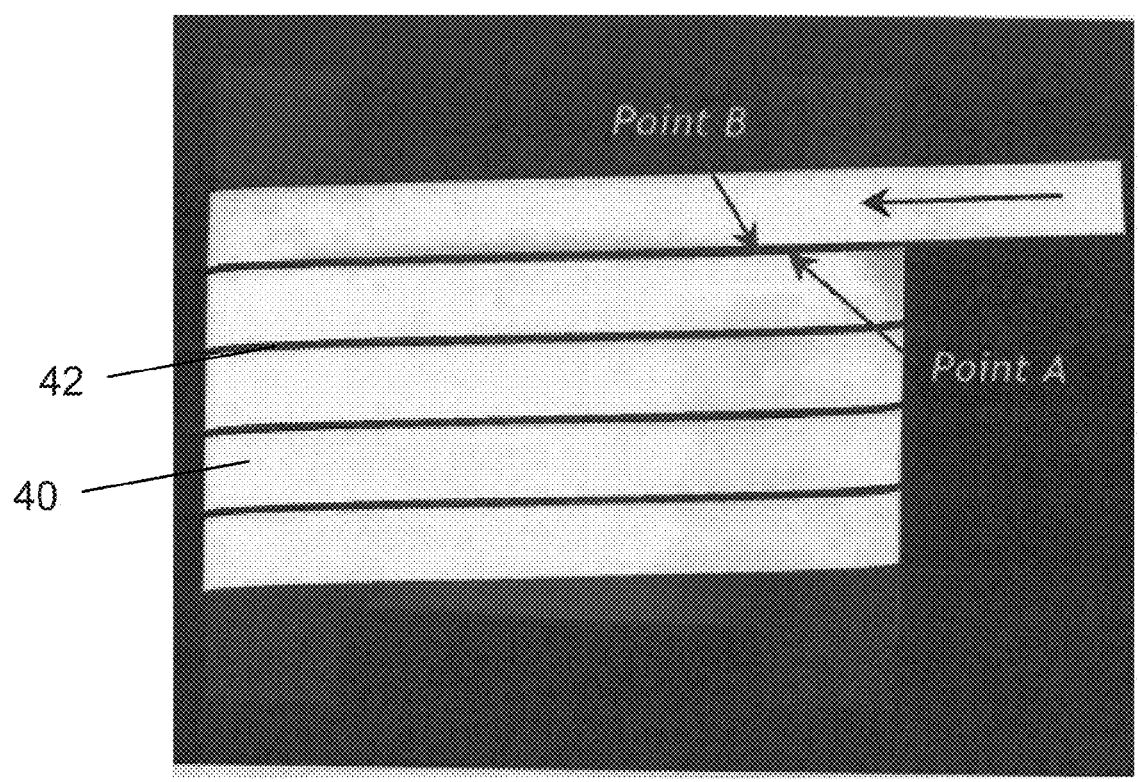
FIG. 3 is one example of fabric prepared using the ultrasonic welding according to one aspect of the present invention.
Figure 4A:
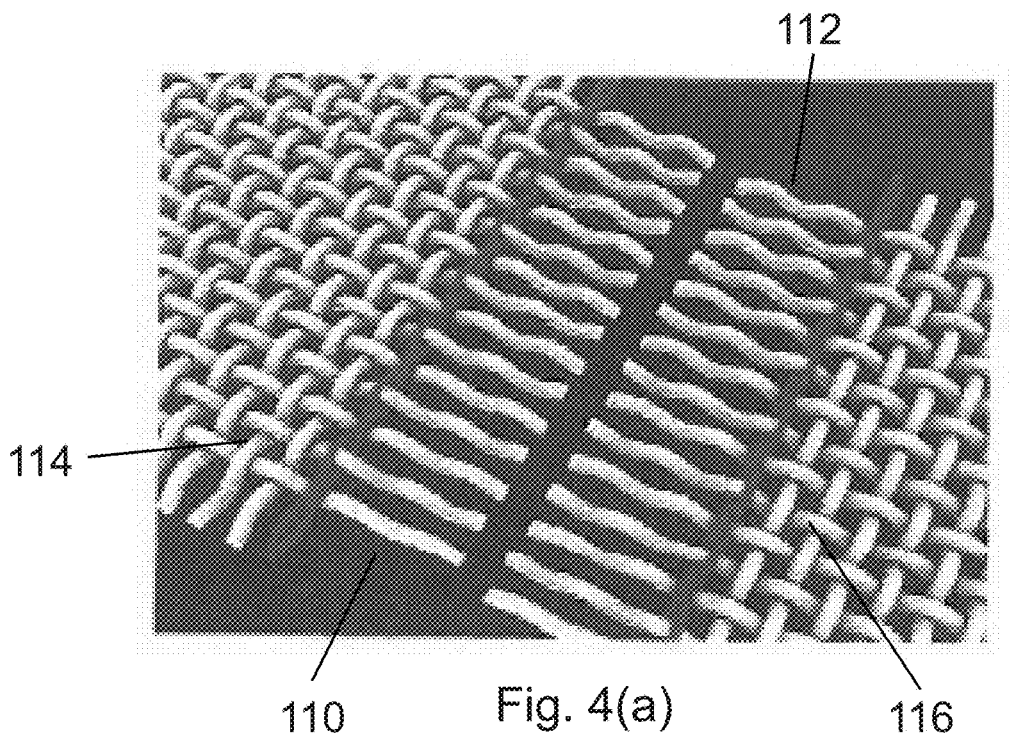
FIGS. 4(a)-4(g) illustrate steps involved in a method of ultrasonic welding according to one embodiment of the present invention.
Figure 4B:
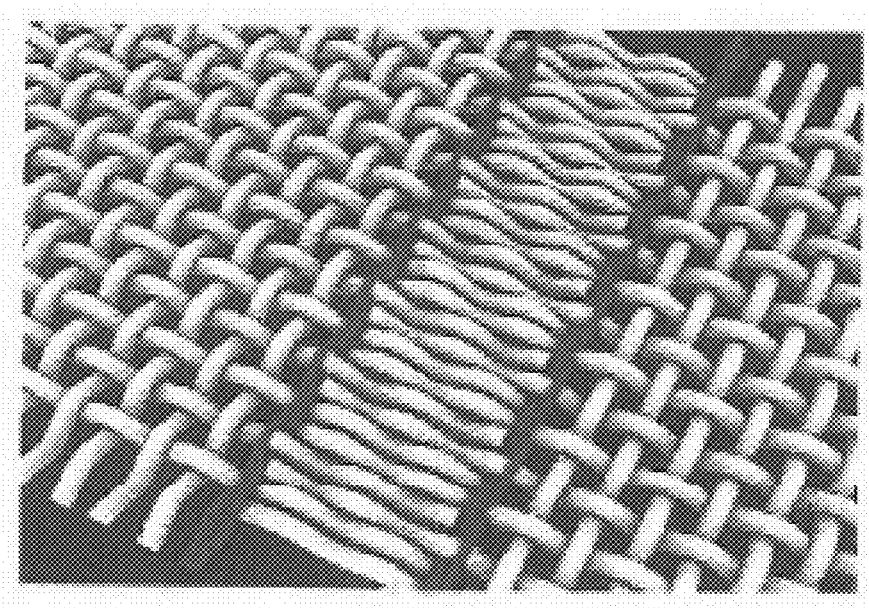
Figure 4C:
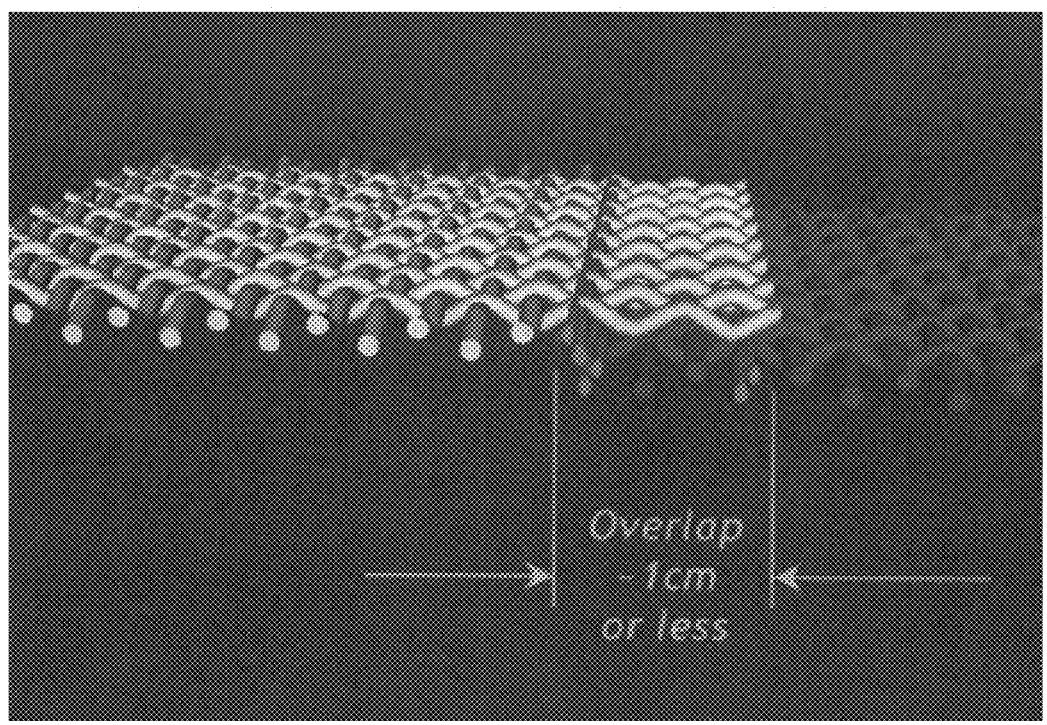
Figure 4D:
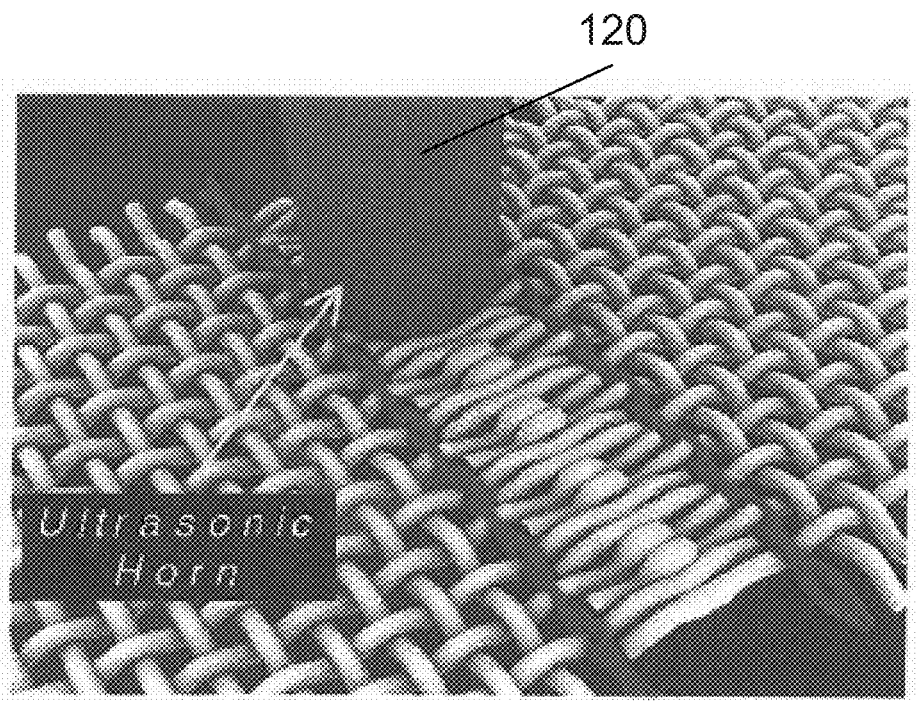
Figure 4E:
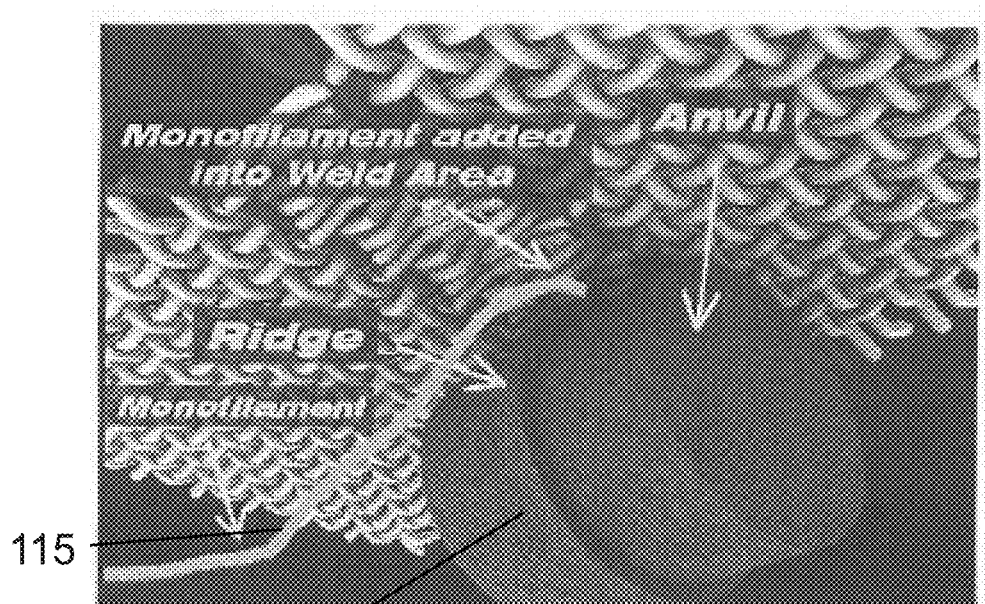
Figure 4F:
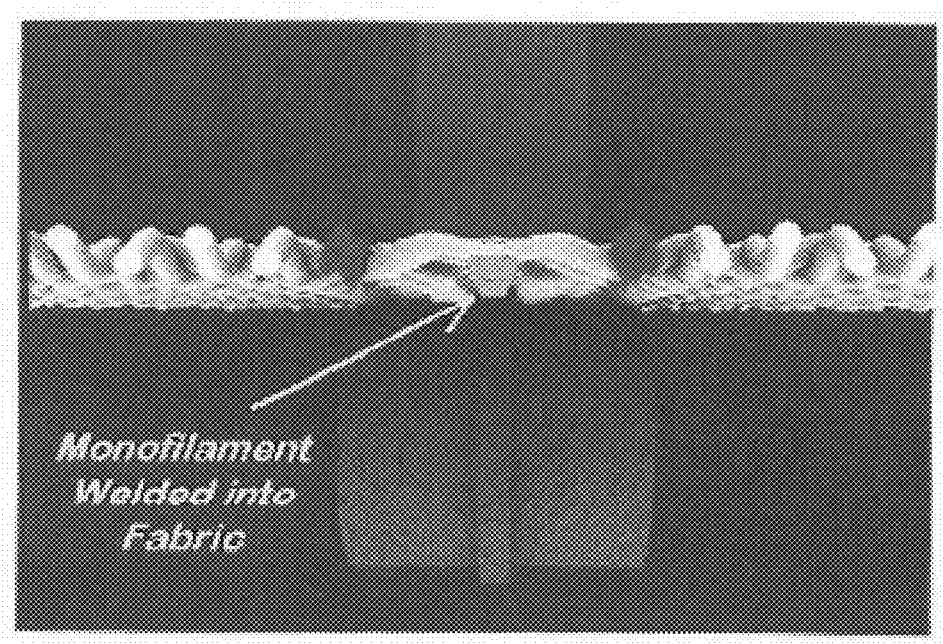
Figure 4G:
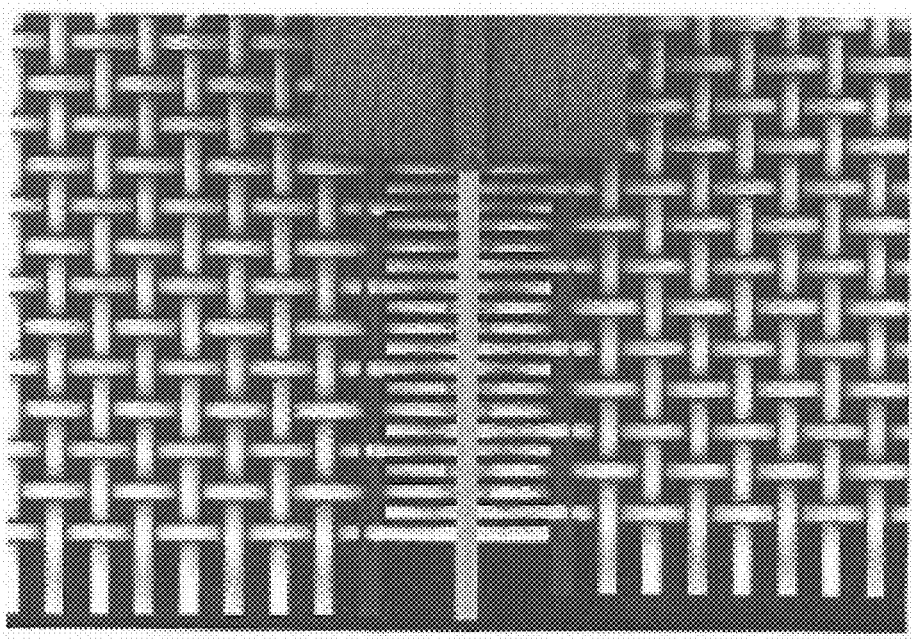
Figure 5A:
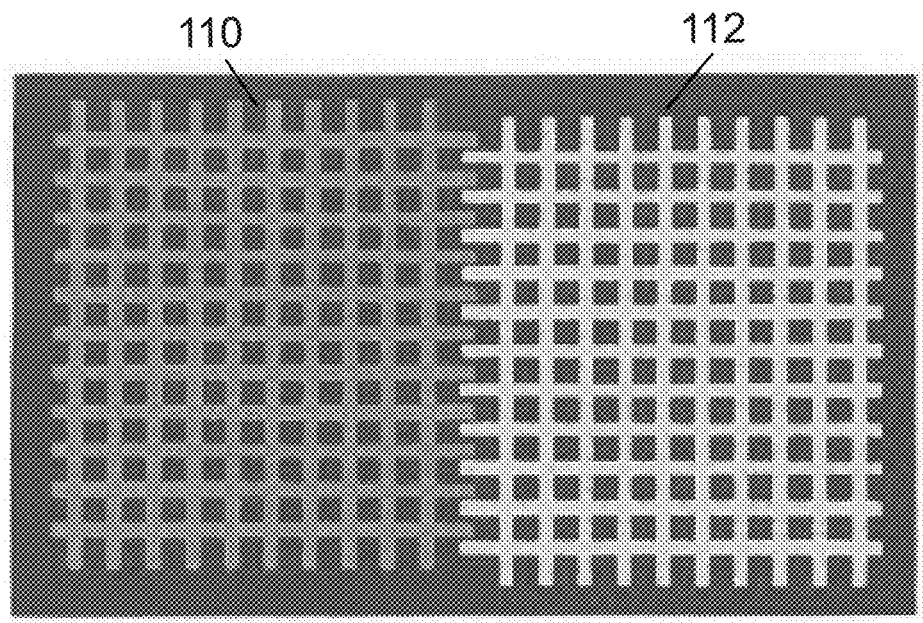
FIGS. 5(a)-5(b) illustrate steps involved in a method of ultrasonic welding according to one embodiment of the present invention.
Figure 5B:
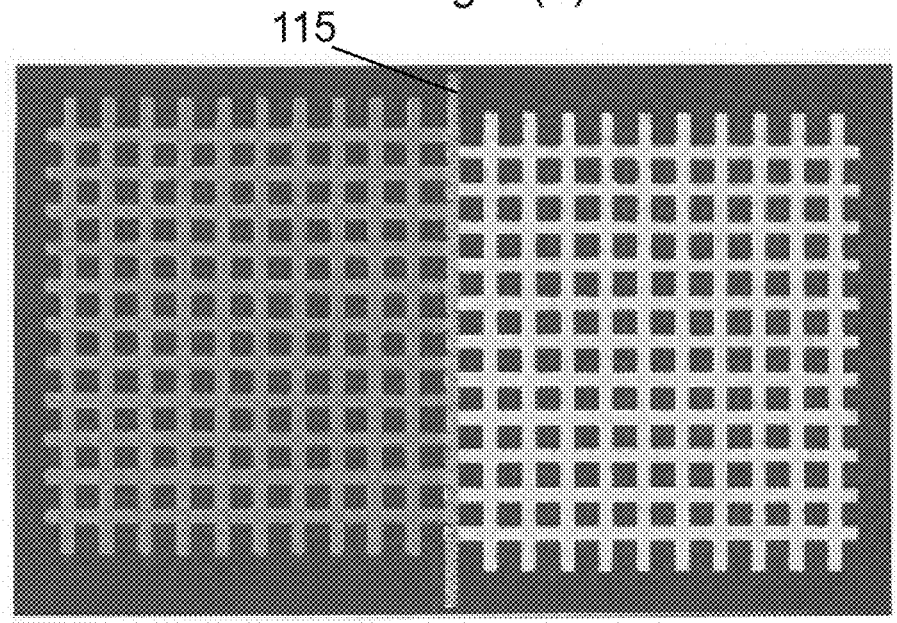
Figure 6:
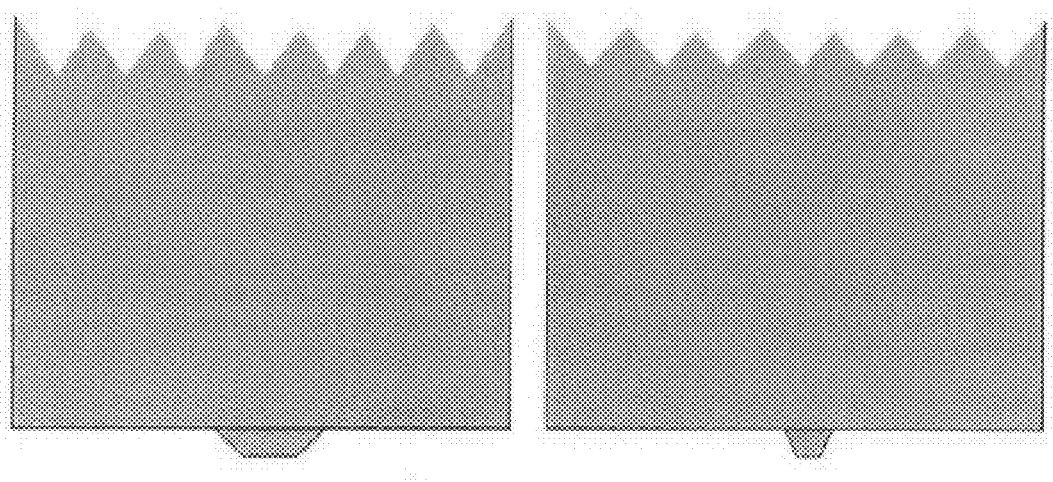
FIG. 6 illustrates cross-sectional view of one ultrasonic horn/anvil.
Figure 7A:
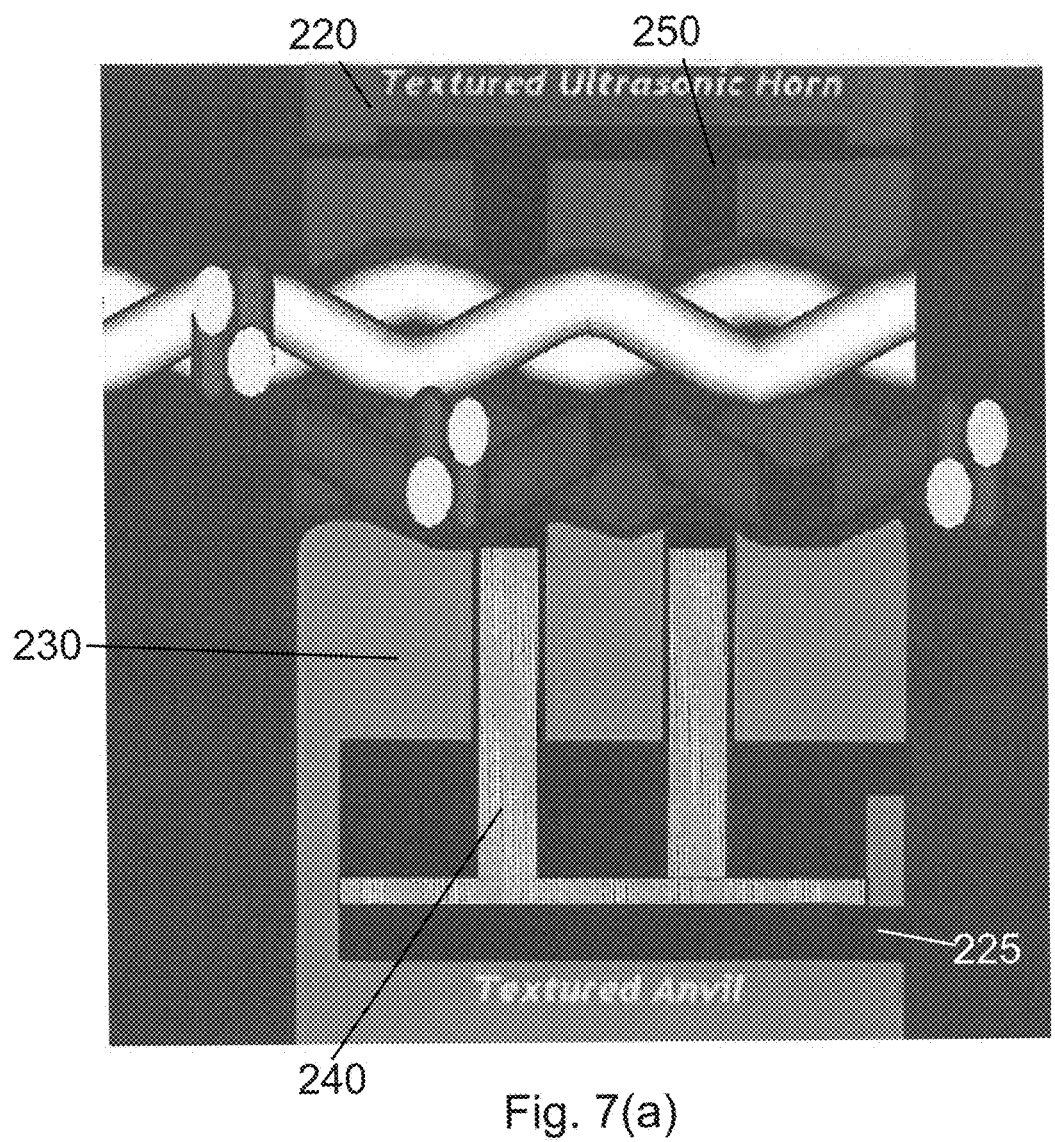
FIGS. 7(a)-7(f) illustrate steps involved in a method of ultrasonic welding according to one embodiment of the present invention.
Figure 7B:
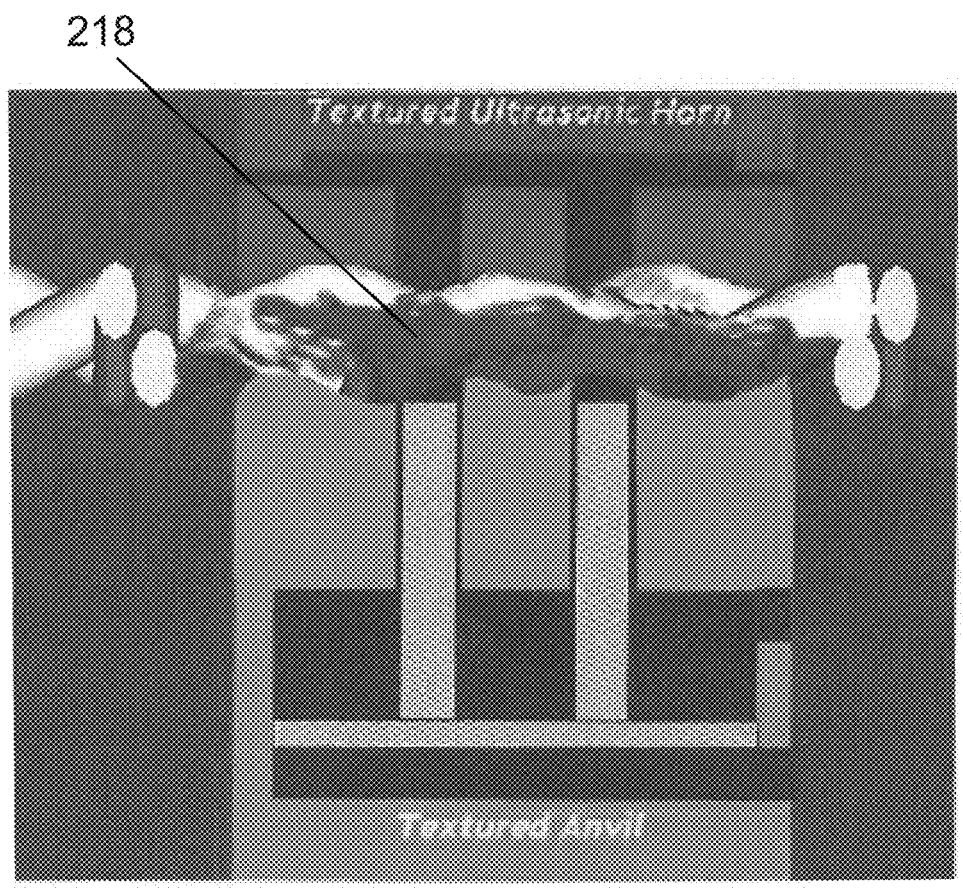
Figure 7C:
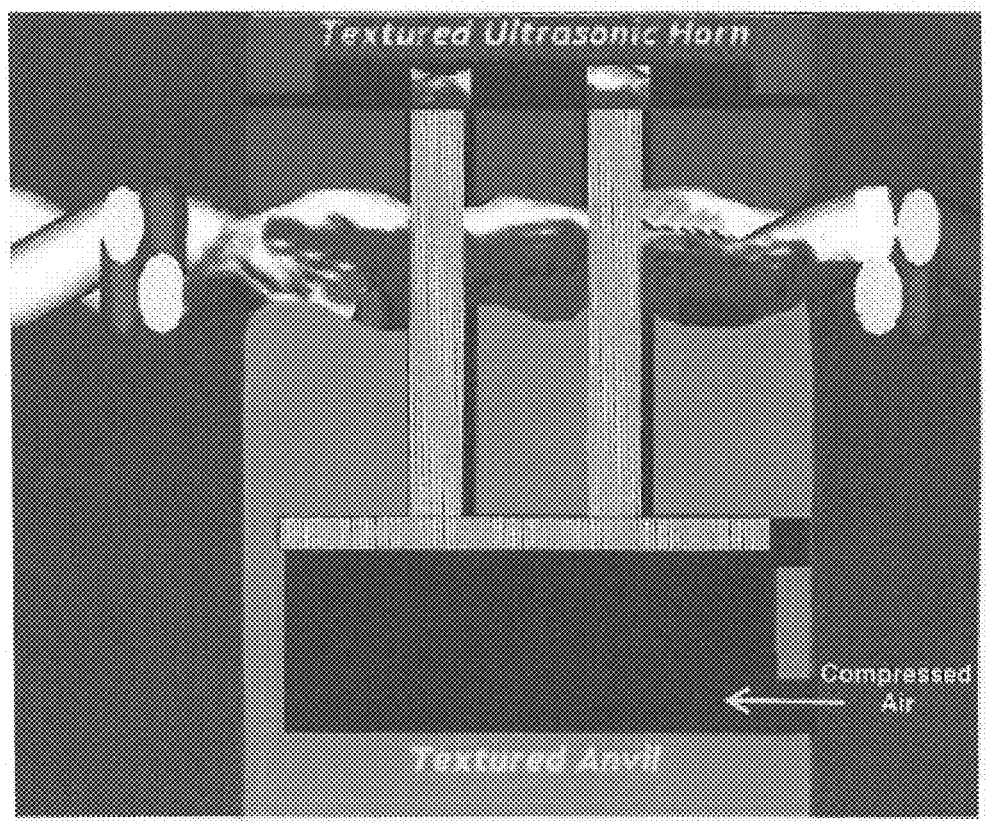
Figure 7D:
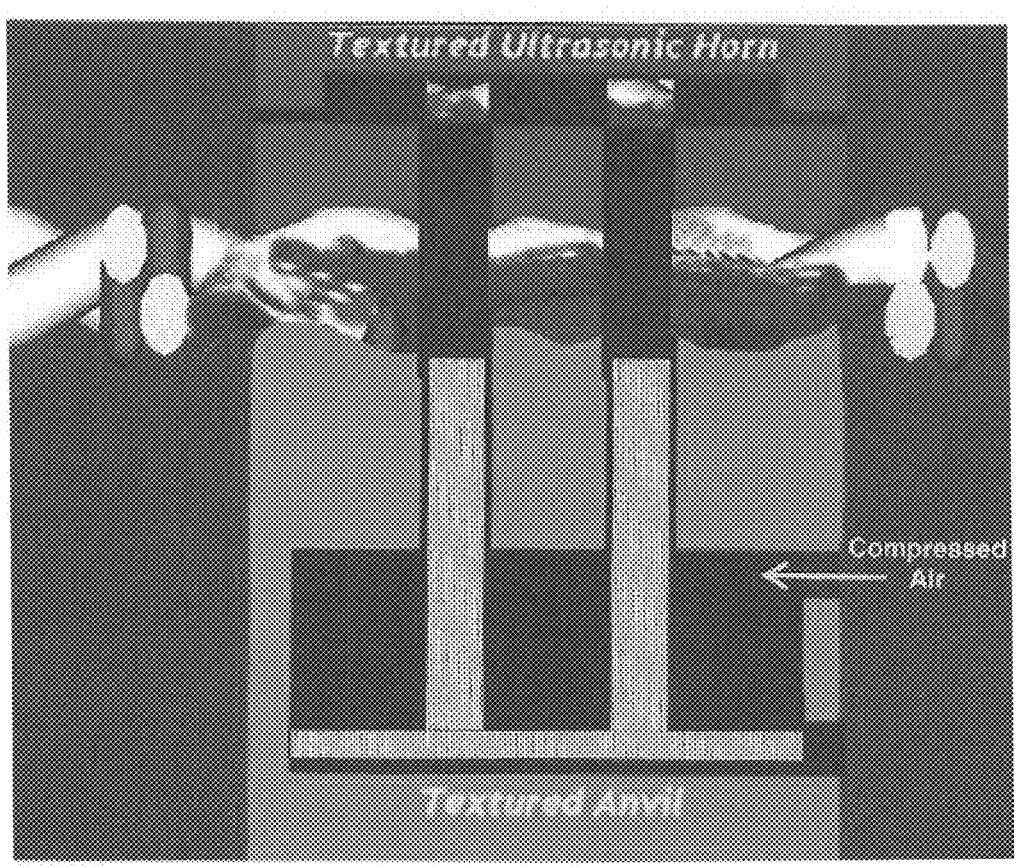
Figure 7E:
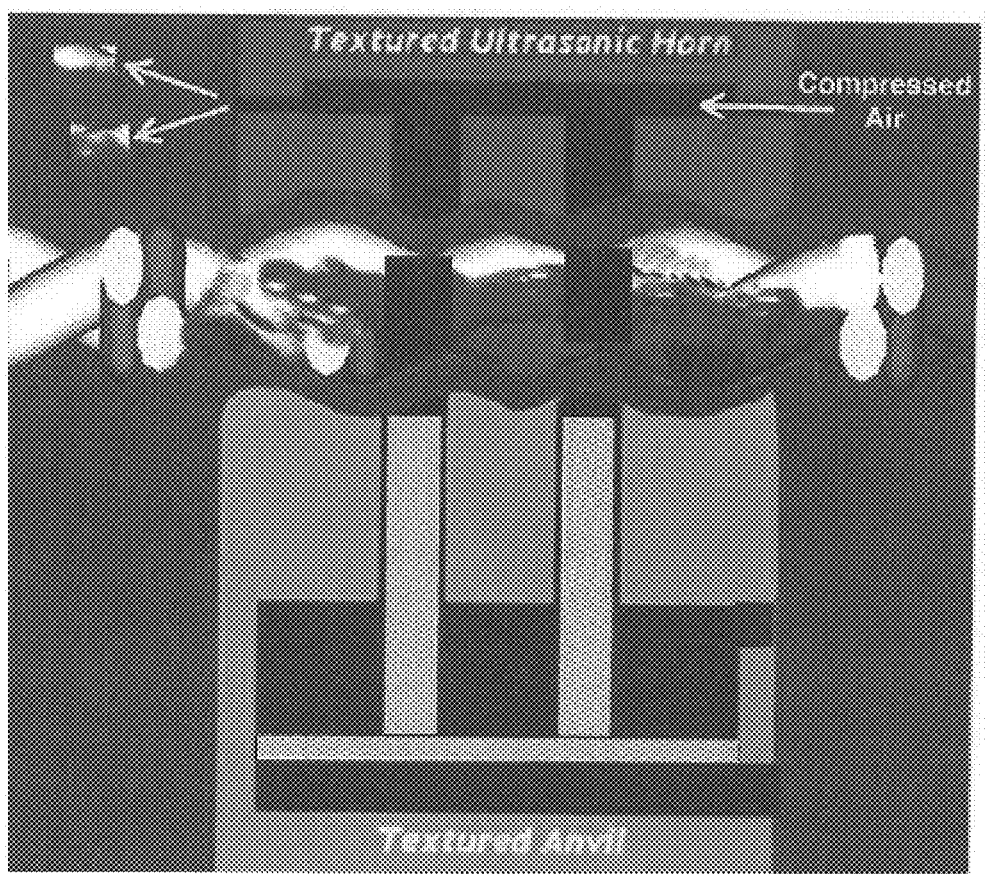
Figure 7F:
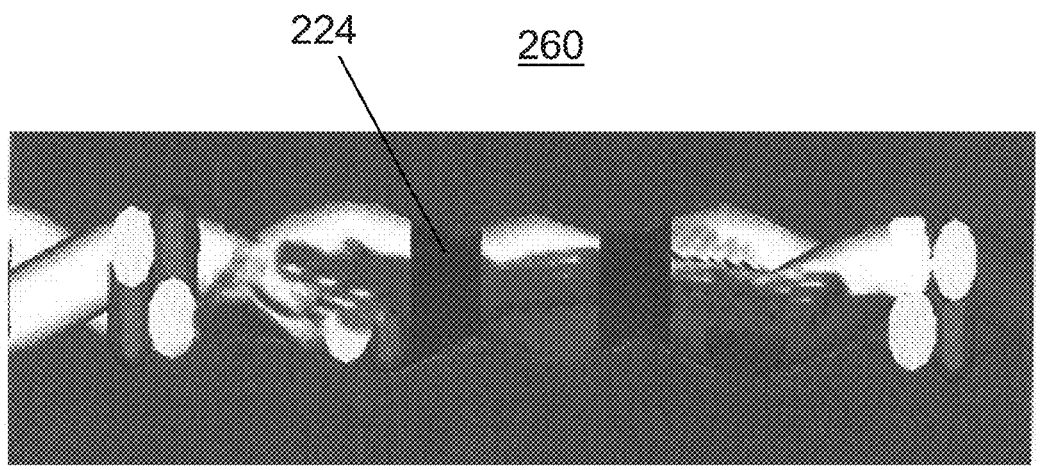
Figure 8A:
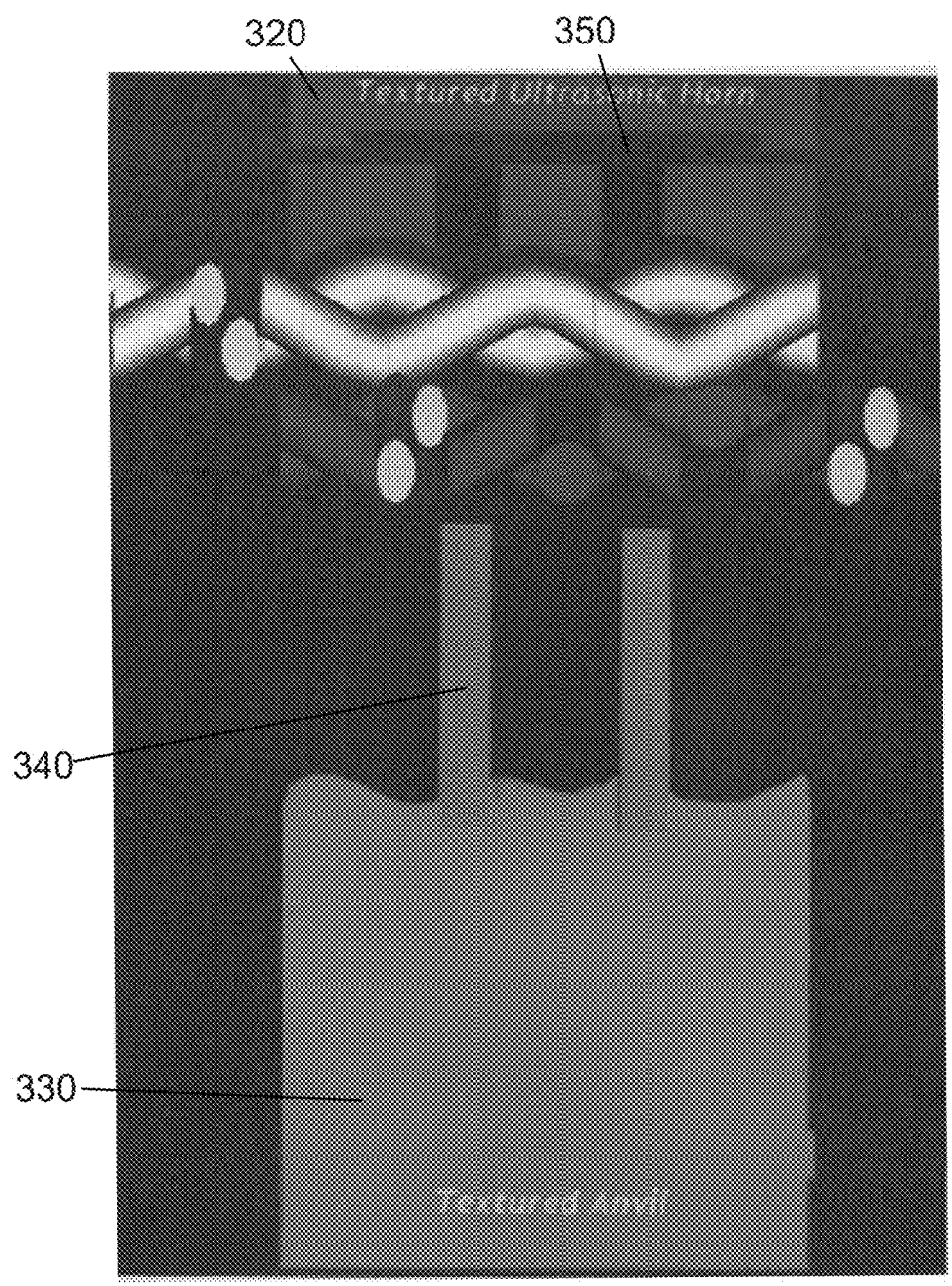
FIGS. 8(a)-8(e) illustrate steps involved in a method of ultrasonic welding according to one embodiment of the present invention.
Figure 8B:
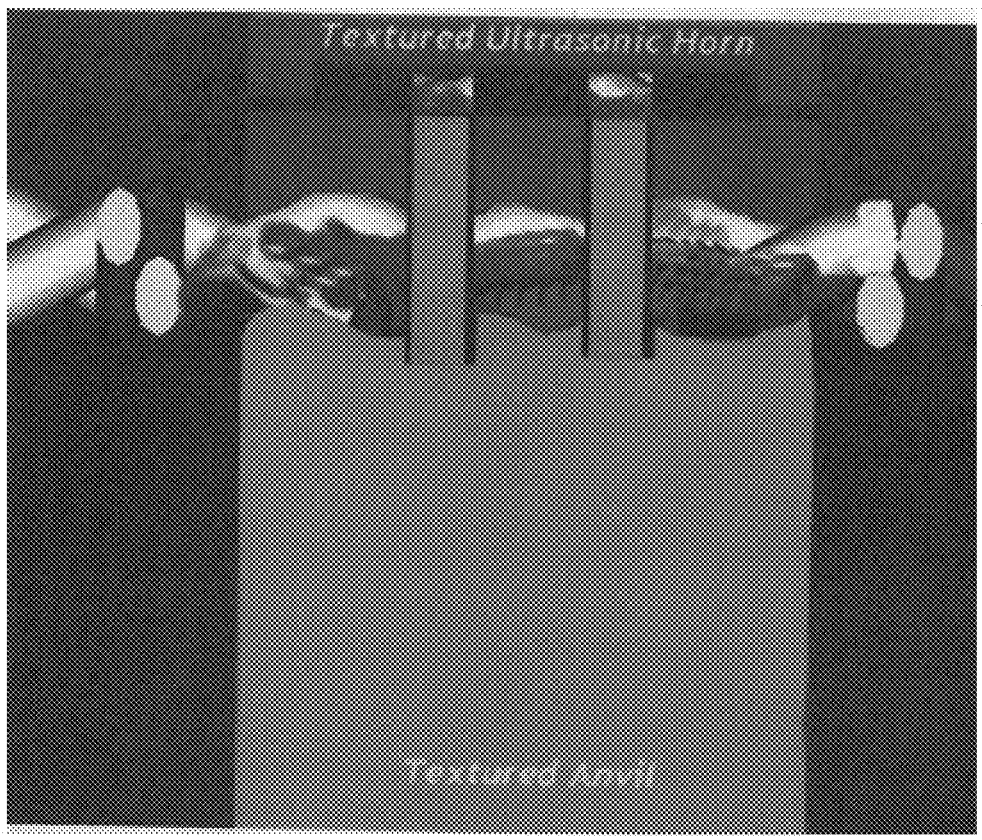
Figure 8C:
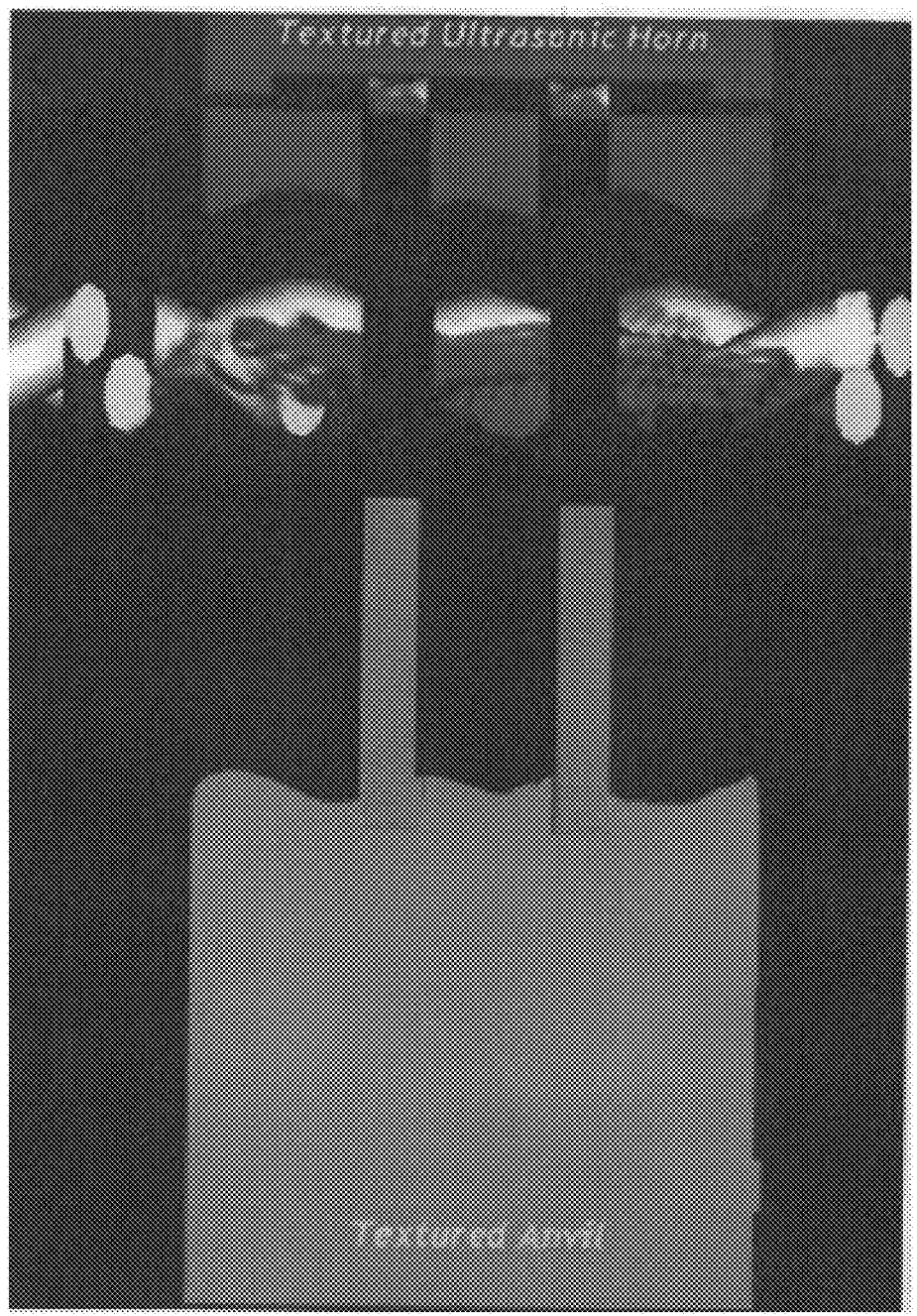
Figure 8D:
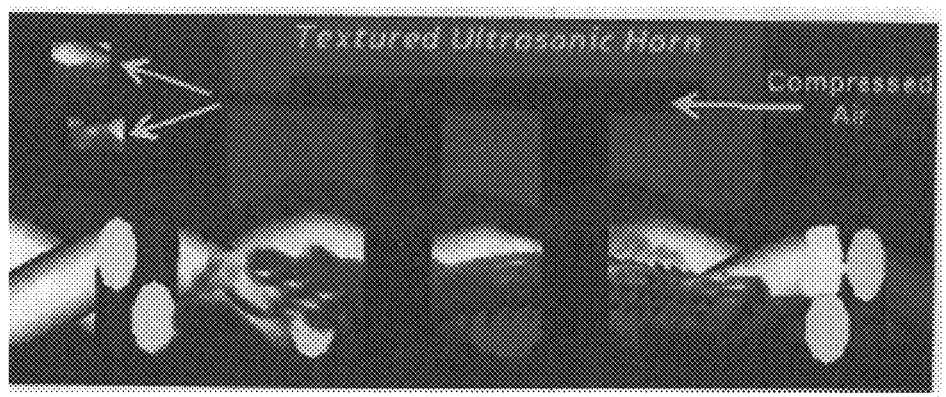
Figure 8E:
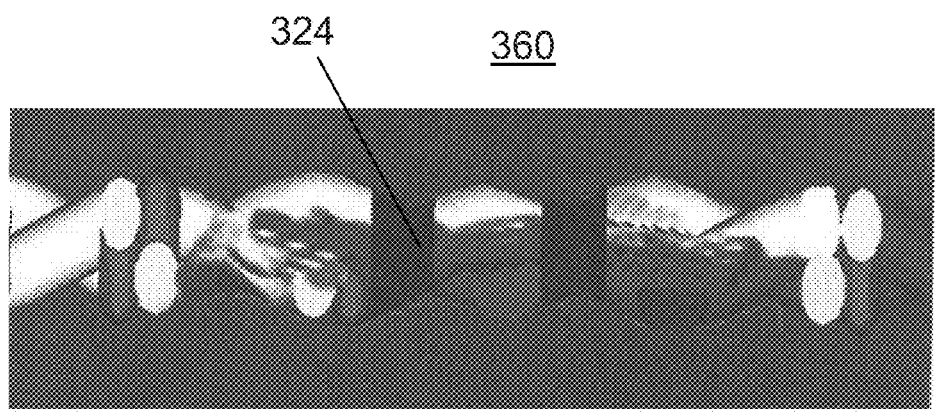

This method can be used to create a spiral wound fabric 100, for example, as taught in Rexfelt '656 by:

1. Feeding a fabric strip in the direction of the black arrow around two parallel rolls spaced apart (rolls not shown) at an appropriate distance from each other, that distance being approximately one half the final required length of the fabric/belt as shown in FIG. 3, for example. The fabric strip would be fed into the system to overlap the adjacent existing fabric loop by some small amount (5 cm or less). The initial woven fabric can be overlapped as is or one or both adjacent fabric edges layers could have some or all of the MD or warp yarns raveled out for the distance of the overlap.

2. Ultrasonically bonding at point A. This bond would reduce the caliper of the 2 stacked layers of fabrics to match the body caliper of the fabric itself. This bond seam would be the width of the overlap of the fabric strips (5 cm or less). The ultrasonic horn (and/or possibly the anvil) could have a texture on its/their surface(s) to impart a pattern that would mimic the surface of the surrounding fabric. Here the overlapped fabric edges are placed between the horn and the anvil before bonding. After bonding, the caliper of the seam is the same as the body of the fabric. But a top view, as seen in FIG. 2(*c*) for example, shows that the holes have closed up with molten material and permeability has dropped.

3. Laser drilling can be performed when the bonded seam area from point A advances to point B. The pattern and size of holes drilled could approximate the voids in the fabric body. This method could be used with either plunge welding (where the fabric would index along in fixed length segments) or continuous welding, which would advance at a fixed rate. It should be noted, however, that the hole sizes may be equal to, less than, or greater than the hole sizes within the body of the fabric. The size of the hole as well as the hole density may depend on the permeability desired in the welded area of the fabric.

It should be noted, however, that when making an endless fabric by joining the adjacent edges of 'parallel' fabric loops using the ultrasonic welding method above, if the strips forming the fabric loops were flat woven requiring CD seams to make the loops endless, then the CD seams in the loops could also be ultrasonically bonded by the described method, and the seams could be staggered or in line across the full fabric width (CD).

In another embodiment, a length of flat-woven fabric with two CD edges folded back upon the fabric body at each end. Some CD yarns may be raveled out, exposing lengths of the MD yarns, which can form loops. The loops from each CD fabric edge are then interdigitated with each other to form a channel, and a pin or pintle is inserted into the channel to form a seam. The seaming loops can be formed by folding back a length of the fabric at each CD edge around a pin, raveling out a plurality of CD yarns at the fold such that when the fabric end is folded back the raveled area allows the MD yarns to form loops, and the fold back fabric length is attached to the body by ultrasonic welding described above. The fold back can be in the range of 5-30 cm. The fold-back seam may be used to secure seaming coils (one or one to each edge) inserted between the MD yarn loops, and connected with pins or pintles to form a spiral link seam. In either case, the fold back area may be bonded to the fabric body prior to interdigitating of the loops through the practice of the present invention.

Alternatively, the seam for flat woven fabrics may be formed as a "pin seam," as known to those skilled in the art, which requires reweaving of MD yarns into the fabric body at each CD edge, and forming loops at each CD edge. The loops from each CD edge are then interdigitated with each other and a pin or pintle is inserted into the space to form a pin seam. In the alternative, spiral coils can be connected to the loops via pintles or pins, forming spiral link seams, as known to those skilled in the art. Such fabrics can also be improved by the ultrasonic welding technique described herein. In such seams, the MD yarns which form the seam loops themselves can be welded or fused to the CD yarns prior to interdigitating of the loops to prevent them from pulling out under operating tension in use.

In one exemplary embodiment of the invention, the horn 120 can have a small raised area, for example. The horn and/or the anvil can be textured or smooth. However, other configurations of large and small, textured, and smooth horns and anvils may also facilitate welding the fabric ends to maintain the topography on one or both sides of the fabric.

One exemplary embodiment of the present invention is a method for joining the intermeshed fringe yarns in a seam area, as shown in FIG. 4(*d*) for example. According to this embodiment, both edges of the fabric are raveled by removal of yarns in one direction and the fringes yarns are meshed together. The ultrasonic horn can be applied to one side, and an anvil to the other side. A monofilament separate from the fabric edges being welded can be added oriented 90 degrees to the fringe yarns to the weld area as the seam is being made. The monofilament can be welded into the fabric seam area and spans the gaps made by raveling. One can see by this method that if fabric spacing is accurately held at a specific orientation, and the additional monofilament(s) is (are) added into the join area accurately, and the appropriate number of monofilaments are added, then a seam is nearly indistinguishable from the body of the fabric.

The method according to this embodiment can be used with a single monofilament or multiple monofilaments added into the weld area. The monofilament yarn(s) can be added on the horn or anvil side of the weld as desired. An anvil or horn with a ridge, as shown, or with groove(s) to hold the added in monofilament yarn(s) can be utilized in the practice of the invention.

As shown in FIG. 2(*c*), the horn has a smooth surface on the face of the raised area which would result in having a fabric weld with a smooth flattened area. However, if maintaining the original topography or shape of the filaments is desired, a textured raised area could be used. This method is a way to achieve a controlled depth weld with extended weld times without using a mechanical stop. This method could also be used in cases where a mechanical stop may not be feasible.

The invention according to another embodiment is a method for creating a seam with texture and permeability by overlapping two edges of the fabric by a small amount, e.g. 20 cm or less, 10 cm or less, or preferably 5 cm or less. The fabric edges can be overlapped as woven or one or both layers could have some or all warp or weft yarns raveled out in an edge portion of the fabric. The next step involves ultrasonically bonding the overlapped fabric edges, which would reduce the caliper of the two stacked fabrics to match the body caliper of the fabric itself. This bond area (seam) would be the width of the original overlap of the fabric edges.

The ultrasonic horn and/or the anvil can have a texture on their surface to impart a pattern that would mimic the surface of the fabric body.

According to one embodiment, during the hold time, a mechanical force (cam, linkage, or air pressure) causes a series of stamps or projections 240 (flat, pointed, cylindrical, rectangular, etc.) which are embedded in either horn 220 or anvil 230 to extend outwards, through the fabric, and into dies on the opposite part 250, as shown in FIG. 7(*a*) for example. In doing so, the projections 240 compress a small section of material 218 between the opposing projections, which may or may not touch each other when the horn and anvil are brought together where the focused ultrasonic energy quickly melts the material 218 and causes it to flow out of the region between the projections, leaving a hole or void 224 straight through the fabric 260, as shown in FIG. 7(f) for example. As shown in FIGS. 7(b)-(d), these stamps would be located so that they correspond to the pattern of the texturing anvil, i.e. the holes created are where there would be permeable channels in the unwelded fabric. Another possibility is that the material 218 impinged between projections may not fully melt and a thin film may remain. In this case, some other energy (compressed air, chemically dissolving, laser energy) may be used to remove the film in a later step, as shown in FIG. 7(e) for example.

The shapes of the formed voids could be round, oval, square, triangle, trapezoidal or any other shape suitable. Air pressure can be employed to retract the stamps 240 as well as to remove the polymer slugs and separate the horn 220 and the anvil 230. Alternatively, the slugs could be blown back through the dies to create a seam with the caliper, texture, and permeability similar to that of the fabric body.

According to one exemplary embodiment, in a subsequent later step, a laser or other mechanical punching/piercing/drilling method is used to make holes in the welded area described above, to either remove a portion of the melted material and restore the localized permeability in that area to what it was before welding, or even to remove some material from the interstices between the yarns to make the local permeability in the welded seam area similar or the same as that of the rest of the fabric body.

However, one negative effect of welding separately may be that the voids and channels in the fabric close up with molten material while under pressure, and a subsequent operation (laser drilling, etc.) is required to create holes and open the fabric to restore permeability in the seam area to match that of the body of the fabric. This subsequent operation could sometimes be time consuming, costly, difficult to align with the texture of the fabric so that holes are created exactly where they are wanted, and the heat that is put into the fabric could be detrimental to its strength.

Therefore, according to one exemplary embodiment, the methods of the present invention can also be adapted to where the ultrasonic energy both bonds the two adjacent fabric edges to each other and removes the bonded material in one single apparatus, as shown in FIGS. 8(a)-(e) for example, where pins or projections 340 can be employed on a fabric contacting surface of the horn and/or anvil to create through holes that allow passage of fluids such as air and water through the fabric seam area.

Some examples of methods described in the above embodiments are as follows:

EXAMPLE 1

Using a 40 kHz ultrasonic welder with texture, a TAD fabric was exposed to a 500 ms weld time and a 1 second hold time (i.e. after welding the textured horn stays in the welding position for 1 second before raising the horn) with a 40 micrometer amplitude. The gauge pressure on the seam area was 144 kPa and the trigger force (TRS) was 111 N.

The result of the process is a TAD fabric with a stronger seam area compared to conventional seams, and which has the texture and permeability that is similar to or same as the rest of the fabric body.

Although the above embodiments are described with reference to woven fabrics, the present invention is not limited as such. For example, the methods described above may be used to seam industrial fabric substrates made from nonwovens, films, MD or CD yarn arrays, or a combination of these structures with woven fabrics. Similarly, some embodiments are directed to forming seams in the cross-machine direction (CD), the invention is not limited as such. The methods described herein may be applicable to seams formed in the machine direction ("MD") as well.

As understood by one of ordinary skill in the art, fabrics such as PMC fabrics and engineered fabrics typically comprise monofilament strands or yarns made of polymers such as polyester, polypropylene, polyamide and polyether ether ketone. However, the fabrics produced according to the above embodiments are not limited as such, and any polymeric material known to one of ordinary skill in the art may be used in the practice of the invention.

Thus the present invention its objects and advantages are realized, and although preferred embodiments have been disclosed and described in detail herein, its scope and objects should not be limited thereby; rather its scope should be determined by that of the appended claims.

The invention claimed is:

1. An industrial fabric comprising:
   a plurality of MD yarns interwoven with a plurality of CD yarns to form a flat woven fabric having two MD edges and two CD edges;
   said fabric having seaming loops comprising a seam area at the CD edges of the fabric, the MD yarns forming the seaming loops being bonded to the CD yarns;
   wherein at least a portion of the seam area of the fabric is placed between an ultrasonic horn and an anvil; and the portion of the seam area is welded by applying ultrasonic energy,
   wherein a fabric contacting surface of the horn and/or anvil is textured or patterned, and
   wherein the flat woven fabric comprises MD yarns woven back into the fabric and forming the seaming loops at widthwise (CD) edges of the fabric.

2. The fabric of claim 1, wherein the seaming loops are formed by folding back a length of the fabric at each CD edge around a pin, raveling out a plurality of CD yarns at the fold such that when the fabric end is folded back the raveled area allows the MD yarns to form loops, and the fold back fabric length is attached to the body by the welding step.

3. The fabric of claim 2, wherein the fold back fabric length is in the range of 5-30 cm.

4. The fabric of claim 2, wherein the fabric seam comprises a pin seam or an inline spiral seam.

5. The fabric of claim 1, further comprising one or more through voids in the welded seam area of the fabric.

6. The fabric of claim 5, wherein the one or more through voids are created by laser drilling or mechanical punching.

7. The fabric of claim 1, wherein air and/or water permeability of the welded seam area of the fabric is similar to or same as that of the rest of the fabric body.

8. The fabric of claim 1, wherein the fabric is a is a final structure, or a component structure for use in a final fabric selected from the group consisting of: a forming fabric, press fabric, dryer fabric, through air dryer (TAD) fabric, shoe press belt (long nip or LNP), transfer or calender belt, an engineered belt used in the production of nonwovens by processes such as airlaid, melt blowing, spunbonding, or hydroentangling, corrugator belt, textile finishing belts such as sanforizing or calendaring belts, tannery belts, pulp forming or pulp-pressing belts, dewatering belt on a double-nip-thickener (DNT) machine, or sludge dewatering belts.

* * * * *